(12) United States Patent
Wakide

(10) Patent No.: US 8,958,712 B2
(45) Date of Patent: Feb. 17, 2015

(54) POWER CONTROL METHOD, POWER CONTROL DEVICE, AND IMAGE FORMING APPARATUS

(71) Applicant: Hitoshi Wakide, Toyokawa (JP)

(72) Inventor: Hitoshi Wakide, Toyokawa (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 165 days.

(21) Appl. No.: 13/667,596

(22) Filed: Nov. 2, 2012

(65) Prior Publication Data

US 2013/0114969 A1 May 9, 2013

(30) Foreign Application Priority Data

Nov. 4, 2011 (JP) .................. 2011-241836

(51) Int. Cl.
  *G03G 15/00* (2006.01)
  *H02J 3/10* (2006.01)
(52) U.S. Cl.
  CPC . *G03G 15/80* (2013.01); *H02J 3/10* (2013.01); *G03G 15/5004* (2013.01)
  USPC .......................................................... 399/88
(58) Field of Classification Search
  CPC ... G03G 15/80; G03G 15/5004; G03G 15/00; H02M 3/333507; H02M 7/217
  USPC .......................................................... 399/88
  See application file for complete search history.

(56) References Cited

U.S. PATENT DOCUMENTS

| | | | |
|---|---|---|---|
| 6,400,119 B1 * | 6/2002 | Garza et al. ................... | 318/798 |
| 7,911,173 B2 * | 3/2011 | Boyadjieff ..................... | 318/621 |
| 8,514,542 B2 * | 8/2013 | Kuo .............................. | 361/160 |
| 2008/0231211 A1 * | 9/2008 | Baarman et al. ............... | 315/294 |
| 2009/0214246 A1 | 8/2009 | Mochizuki | |

(Continued)

FOREIGN PATENT DOCUMENTS

| | | |
|---|---|---|
| JP | 08-122368 A | 5/1996 |
| JP | 2002-268450 A | 9/2002 |

(Continued)

OTHER PUBLICATIONS

Machine translation of Naito JP 2010-181567 A, publication date: Aug. 19, 2010.*

(Continued)

*Primary Examiner* — Clayton E Laballe
*Assistant Examiner* — Frederick Wenderoth
(74) *Attorney, Agent, or Firm* — Buchanan Ingersoll & Rooney PC

(57) ABSTRACT

A power control method for performing phase control is provided. The method includes generating a zero-crossing signal that indicates a first level if an absolute value of AC voltage is smaller than a predetermined value, and indicates a second level if the absolute value of the AC voltage is larger than the predetermined value; detecting a zero-crossing width and a non-zero-crossing width, the zero-crossing width being a time width for a case where the absolute value of the AC voltage is smaller than the predetermined value, the non-zero-crossing width being a time width for a case where the absolute value is larger than the predetermined value; detecting a frequency and a voltage value of the AC voltage based on the zero-crossing width and the non-zero-crossing width; and performing phase control depending on the frequency and the voltage value.

20 Claims, 40 Drawing Sheets

(56) References Cited

U.S. PATENT DOCUMENTS

2011/0123208 A1     5/2011    Inukai
2011/0299212 A1*   12/2011   Kuo .............................. 361/160

FOREIGN PATENT DOCUMENTS

| | | |
|---|---|---|
| JP | 2007-064892 A | 3/2007 |
| JP | 2009-204638 A | 9/2009 |
| JP | 2010-181567 A | 8/2010 |
| JP | 2011-113807 A | 6/2011 |

OTHER PUBLICATIONS

Machine translation of Okdada JP 2002-268450 A, publication date: Sep. 18, 2002.*

Office Action (Notification of Reason(s) for Refusal) issued on Oct. 29, 2013, by the Japanese Patent Office in corresponding Japanese Patent Application No. 2011-241836, and an English Translation of the Office Action. (6 pages).

* cited by examiner

| | 50Hz | 60Hz |
|---|---|---|
| Tc1 | 9.00 ms | 7.50 ms |
| Tc2 | 8.50 ms | 7.08 ms |
| Tc3 | 8.00 ms | 6.67 ms |
| Tc4 | 7.50 ms | 6.25 ms |
| Tc5 | 7.00 ms | 5.83 ms |
| Tc6 | 6.50 ms | 5.42 ms |
| Tc7 | 6.00 ms | 5.00 ms |
| Tc8 | 5.50 ms | 4.58 ms |
| Tc9 | 5.00 ms | 4.17 ms |
| Tc10 | 4.50 ms | 3.75 ms |
| Tc11 | 4.00 ms | 3.33 ms |
| Tc12 | 3.50 ms | 2.92 ms |
| Tc13 | 3.00 ms | 2.50 ms |

(ZERO-CROSSING SIGNAL INTERVAL)

| VOLTAGE VALUE ve | 130V | 120V | 110V | 100V | 90V | 80V |
|---|---|---|---|---|---|---|
| "H" WIDTH [ms] | 8.52 | 8.40 | 8.26 | 8.08 | 7.84 | 7.56 |
| "L" WIDTH [ms] | 1.48 | 1.60 | 1.74 | 1.92 | 2.16 | 2.44 |
| "H" WIDTH VARIATION RATIO [%] | 5 | 4 | 2 | 0 | -3 | -6 |
| "L" WIDTH VARIATION RATIO [%] | -23 | -17 | -9 | 0 | 13 | 27 |
| VARIATION RATIO [%] | 28 | 21 | 12 | 0 | 10 | 21 |
| VOLTAGE VARIATION RATIO [%] | 30 | 20 | 10 | 0 | -10 | -20 |

|  | 72Hz | 63Hz | 60Hz | 50Hz | 47Hz | 40Hz |
|---|---|---|---|---|---|---|
| "H" WIDTH [ms] | 5.61 | 6.41 | 6.73 | 8.08 | 8.58 | 10.08 |
| "L" WIDTH [ms] | 1.33 | 1.53 | 1.61 | 1.92 | 2.06 | 2.42 |
| "H" WIDTH RATIO [%] | 81 | 81 | 81 | 81 | 81 | 81 |
| "L" WIDTH RATIO [%] | 19 | 19 | 19 | 19 | 19 | 19 |

| | HEATER OFF RATIO | HEATER ON RATIO |
|---|---|---|
| 1 | 80 % | 20 % |
| 2 | 75 % | 25 % |
| 3 | 70 % | 30 % |
| 4 | 65 % | 35 % |
| 5 | 60 % | 40 % |
| 6 | 55 % | 45 % |
| 7 | 50 % | 50 % |
| 8 | 45 % | 55 % |
| 9 | 40 % | 60 % |
| 10 | 35 % | 65 % |
| 11 | 30 % | 70 % |
| 12 | 25 % | 75 % |
| 13 | 20 % | 80 % |

|   | HEATER OFF RATIO | HEATER ON RATIO |
|---|---|---|
| 1 | 20 % | 80 % |
| 2 | 25 % | 75 % |
| 3 | 30 % | 70 % |
| 4 | 35 % | 65 % |
| 5 | 40 % | 60 % |
| 6 | 45 % | 55 % |
| 7 | 50 % | 50 % |
| 8 | 55 % | 45 % |
| 9 | 60 % | 40 % |
| 10 | 65 % | 35 % |
| 11 | 70 % | 30 % |
| 12 | 75 % | 25 % |
| 13 | 80 % | 20 % |

|    | HEATER OFF RATIO | HEATER ON RATIO |
|----|------------------|-----------------|
| 1  | 8.00 ms          | 2.00 ms         |
| 2  | 7.50 ms          | 2.50 ms         |
| 3  | 7.00 ms          | 3.00 ms         |
| 4  | 6.50 ms          | 3.50 ms         |
| 5  | 6.00 ms          | 4.00 ms         |
| 6  | 5.50 ms          | 4.50 ms         |
| 7  | 5.00 ms          | 5.00 ms         |
| 8  | 4.50 ms          | 5.50 ms         |
| 9  | 4.00 ms          | 6.00 ms         |
| 10 | 3.50 ms          | 6.50 ms         |
| 11 | 3.00 ms          | 7.00 ms         |
| 12 | 2.50 ms          | 7.50 ms         |
| 13 | 2.00 ms          | 8.00 ms         |

| | HEATER OFF RATIO | HEATER ON RATIO |
|---|---|---|
| 1 | 1.54 ms | 6.15 ms |
| 2 | 1.92 ms | 5.77 ms |
| 3 | 2.31 ms | 5.38 ms |
| 4 | 2.69 ms | 5.00 ms |
| 5 | 3.08 ms | 4.62 ms |
| 6 | 3.46 ms | 4.23 ms |
| 7 | 3.85 ms | 3.85 ms |
| 8 | 4.23 ms | 3.46 ms |
| 9 | 4.62 ms | 3.08 ms |
| 10 | 5.00 ms | 2.69 ms |
| 11 | 5.38 ms | 2.31 ms |
| 12 | 5.77 ms | 1.92 ms |
| 13 | 6.15 ms | 1.54 ms |

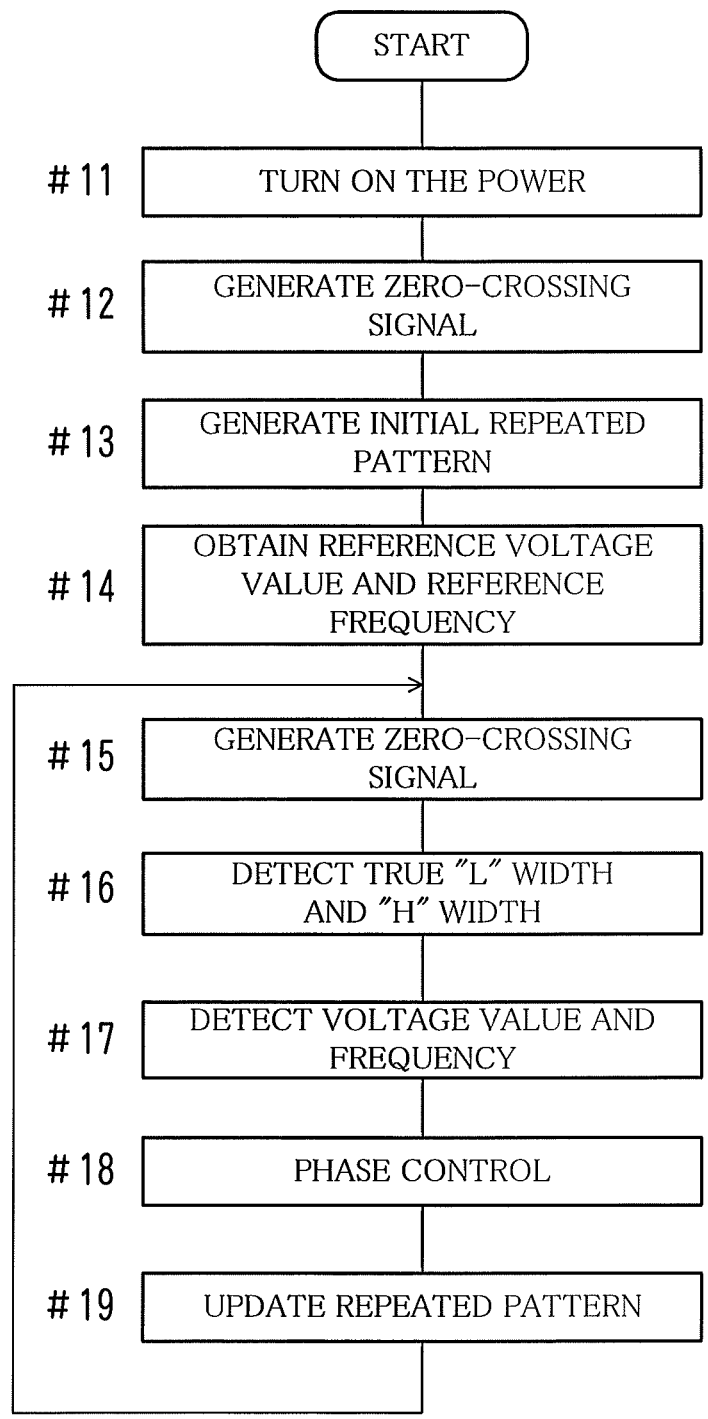

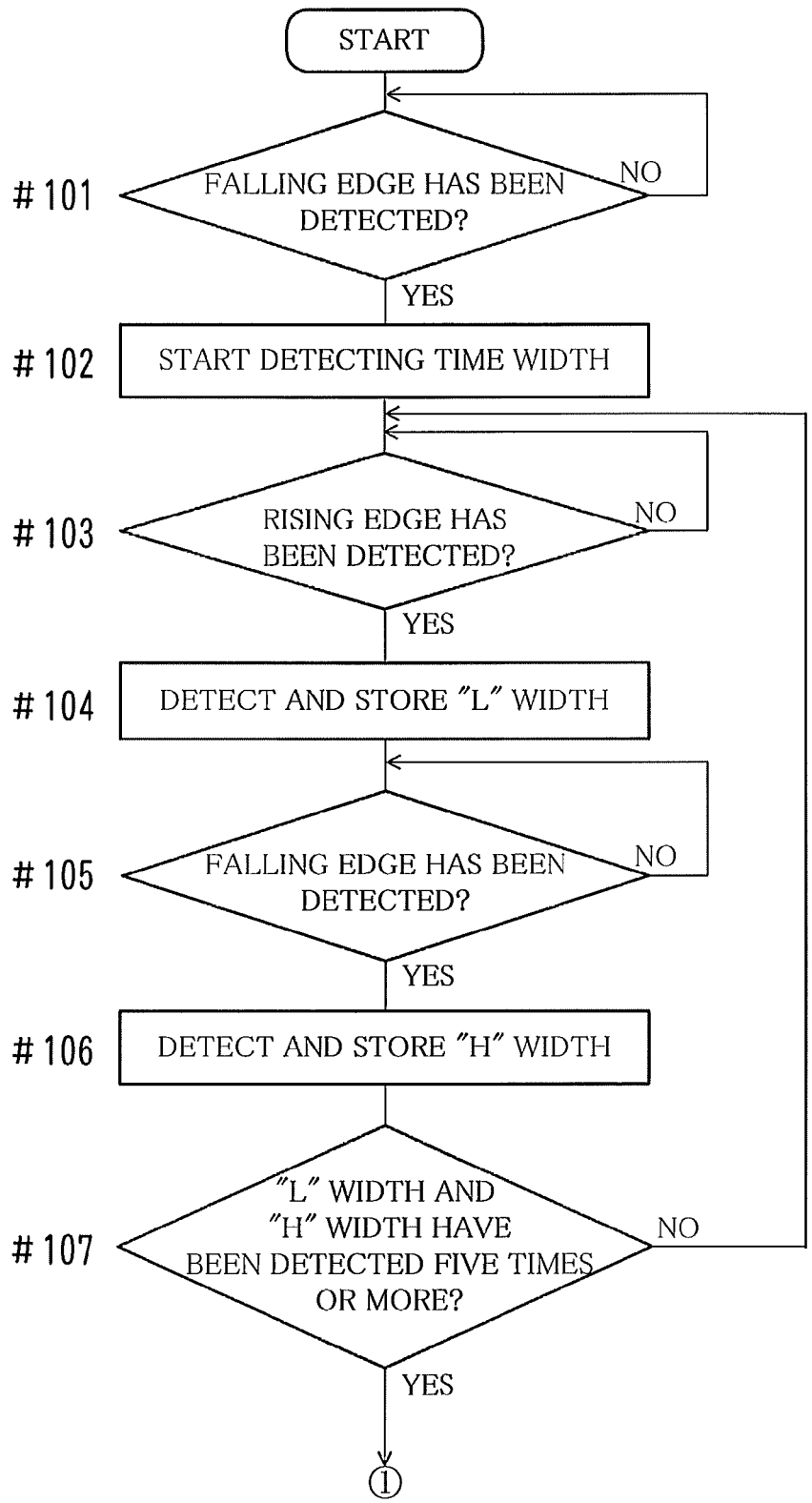

POWER CONTROL METHOD, POWER CONTROL DEVICE, AND IMAGE FORMING APPARATUS

This application is based on Japanese patent application No. 2011-241836 filed on Nov. 4, 2011, the contents of which are hereby incorporated by reference.

BACKGROUND OF THE INVENTION

1. Field of the Invention

The present invention relates to a power control method, a power control device, and an image forming apparatus. The present invention is used for power control in an image forming apparatus using electrophotography, e.g., a copier, a printer, a facsimile machine, or a combination machine thereof. In particular, the present invention is used for power control on a fixing heater of an image forming apparatus in an environment in which, for example, a frequency or a voltage of an AC power supply varies substantially, or, in an electrically noisy environment.

2. Description of the Related Art

An image forming apparatus employing electrophotography is usually provided with a heater to fuse, by heat, a toner image formed on paper to fix the same thereon. In recent years, such a fixing heater has tended to consume a large amount of power. This causes a power supply voltage to drop due to a large amount of inrush currents, which has the adverse effect of flickering of fluorescent lights in the power system where the heater is provided. Further, the inrush currents probably damage a switching device such as a transistor or a triac to control the driving of the heater.

In order to solve such problems, through up-regulation is performed to gradually increase a conduction current in an early stage where the heater is energized. In the through up-regulation, a phase angle at which a switching device is turned ON in each half cycle of AC is controlled to gradually increase a conduction angle $\phi$ at which the switching device is turned ON from 0 to $\pi$. This can increase the temperature of the heater as quickly as possible, and further, minimize inrush currents. Further, through down-regulation is performed, as necessary, to gradually reduce the conduction current at a time when supplying power to the heater is finished. Such phase control makes it possible to control the temperature of the heater in a stable manner.

Meanwhile, in a case where an image forming apparatus is located in an undesirable power supply environment, e.g., a case where the apparatus is located in an environment where a power distribution line has high impedance, voltage drop of voltage inputted to the image forming apparatus occurs in the form of noise at a time when the heater is turned ON during the phase control.

In such a case, a zero-crossing signal used for the phase control is sometimes outputted not at a proper time of a zero-crossing point but at an improper time. Thereby, the phase control is performed synchronously with an improper zero-crossing signal, so that the proper phase control cannot be performed in a stable manner. In such a case, since devices are prone to malfunction, it is sometimes determined that an error occurs in the power supply and the devices are controlled to stop.

In relation to such problems, a technology is proposed in Japanese Laid-open Patent Publication No. 2007-064892. According to the technology, when the zero crossing pulse width of an input AC power supply is less than a predetermined range, it is determined that a failure occurs from the power supply noise. When the zero crossing pulse width is the predetermined range or larger, it is determined that a failure occurs from power supply interruption.

Another technology is disclosed in Japanese Laid-open Patent Publication No. 2009-204638. According to the technology, in order to prevent malfunctions of a heater by ignoring the interrupt of a zero-crossing generated due to noise, a control section ignores the rise in the zero-crossing signal during setting time T from the rise of the heater control signal.

However, according to the foregoing technologies disclosed in Japanese Laid-open Patent Publication No. 2007-064892 and No. 2009-204638, if power supply noise is present in a predetermined range of a zero-crossing pulse, and the zero-crossing signal is erroneously deemed as a true zero-crossing signal, or, alternatively, if a true zero-crossing signal overlaps power supply noise, then the true zero-crossing signal cannot be detected.

As discussed earlier, an AC power supply may be unstable depending on an environment in which an image forming apparatus is installed. This causes a voltage and a frequency to vary, so that the waveform of a zero-crossing signal varies and power supply noise is caused in some cases. In such a case, even if a predetermined period is determined as a period during which a false zero-crossing signal is generated, the period probably changes with the variation in voltage and frequency. As a result, detecting a normal zero-crossing signal is impossible.

SUMMARY

The present disclosure is directed to solve the problems pointed out above, and therefore, an object of an embodiment of the present invention is to perform, even when the voltage or frequency of an AC power supply varies, phase control coping with the variation, and to perform phase control by which malfunction is less likely to occur.

According to an aspect of the present invention, a power control method for performing phase control by using AC power supplied from an AC power supply is provided. The method includes: generating a zero-crossing signal that indicates a first level if an absolute value of AC voltage from the AC power supply is equal to or smaller than a predetermined value, and indicates a second level if the absolute value of the AC voltage is larger than the predetermined value; detecting a zero-crossing width and a non-zero-crossing width of the zero-crossing signal, the zero-crossing width being a time width of the zero-crossing signal for a case where the absolute value of the AC voltage is equal to or smaller than the predetermined value, the non-zero-crossing width being a time width of the zero-crossing signal for a case where the absolute value of the AC voltage is equal to or larger than the predetermined value; detecting a frequency and a voltage value of the AC voltage based on the zero-crossing width detected and the non-zero-crossing width detected; and performing phase control depending on the frequency detected and the voltage value detected.

Preferably, the power control method includes: detecting the zero-crossing width where no influence of noise is present and the non-zero-crossing width where no influence of noise is present by using a reference zero-crossing width that is used as a reference of zero-crossing width, a reference non-zero-crossing width that is used as a reference of non-zero-crossing width, the zero-crossing width detected, and the non-zero-crossing width detected, the reference zero-crossing width and the reference non-zero-crossing width being generated based on the zero-crossing width and the non-zero-crossing width in the AC voltage where no noise occurs; detecting the frequency and the voltage value based on the zero-crossing width where no influence of noise is present and the non-zero-crossing width where no influence of noise is present; and performing the phase control depending on the frequency detected and the voltage value detected.

These and other characteristics and objects of the present invention will become more apparent by the following descriptions of preferred embodiments with reference to drawings.

BRIEF DESCRIPTION OF THE DRAWINGS

FIG. 6 is a diagram showing an example of data indicating stand-by time in through up-regulation, and so on.

FIGS. 11A and 11B are diagrams showing an example of data used for calculating frequencies and voltage values.

FIGS. 12A-12D are diagrams showing an example of data for through up-regulation, and so on.

FIG. 13 is a flowchart depicting an example of the outline of power control performed by a power control portion.

FIG. 14 is a first flowchart depicting an example of operation for a case where the power of an image forming apparatus is turned ON.

FIG. 15 is a second flowchart depicting an example of operation for a case where the power of an image forming apparatus is turned ON.

DESCRIPTION OF THE PREFERRED EMBODIMENTS

[Structure of Image Forming Apparatus]

Figure 1:
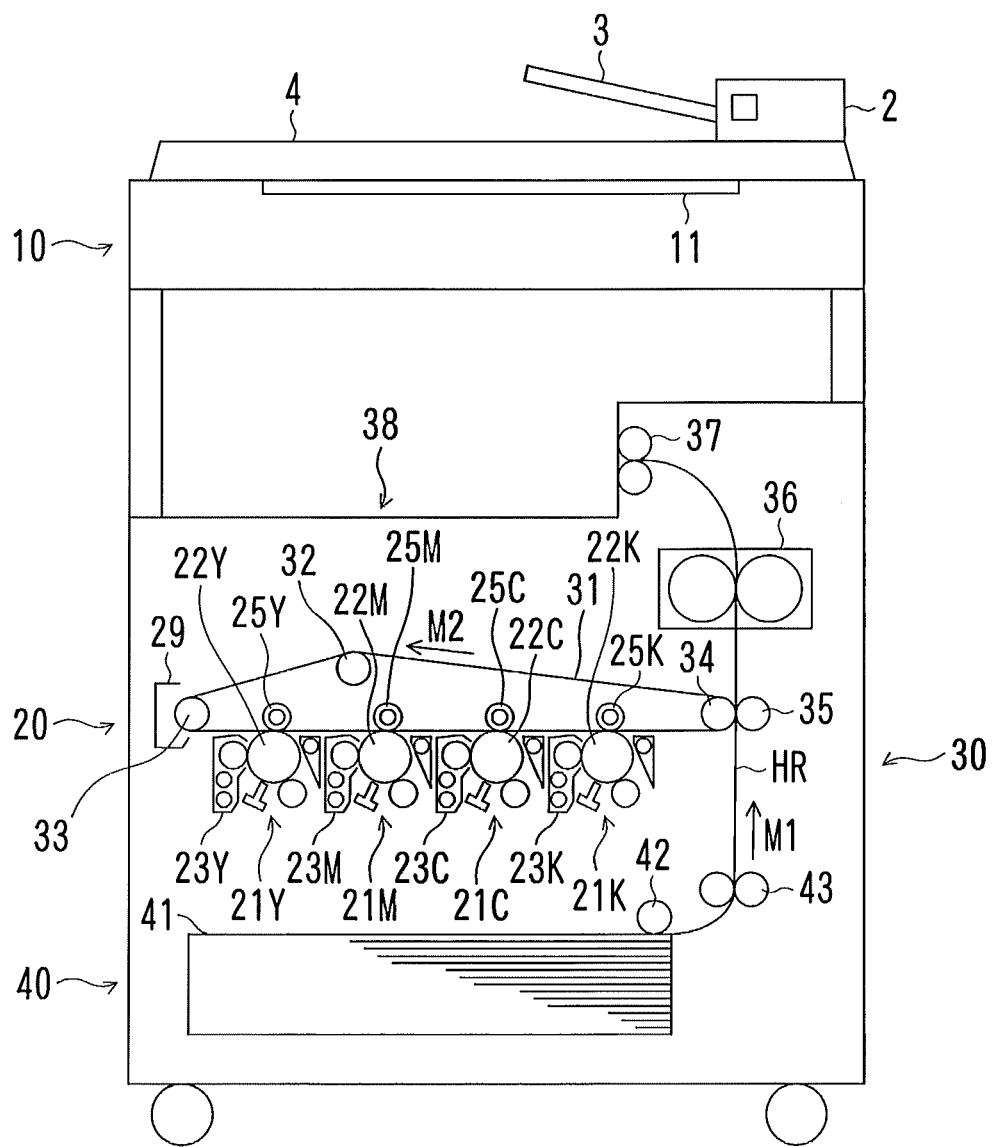
FIG. 1 is a diagram showing an example of a structure of an image forming apparatus according to an embodiment of the present invention.

FIG. 1 is a diagram showing an example of a structure of an image forming apparatus 1 according to an embodiment of the present invention.

Referring to FIG. 1, the image forming apparatus 1 is a full-color image forming apparatus which contains therein a tandem print engine and uses electrophotography. The image forming apparatus 1 is an apparatus that is generally called a "multifunction device" or a "Multi-Functional Peripheral (MFP)". The image forming apparatus 1 is an apparatus in which various functions such as copying, network printing (PC printing), faxing, and scanning are consolidated.

The image forming apparatus 1 includes an image reading portion 10, an image producing portion (printer portion) 20, a paper conveying portion 30, and a paper storage portion 40.

The image reading portion 10 is provided with a document input tray 3 onto which a document with a plurality of pages is placed, a document glass 11, a document feeder 2 for automatically feeding each sheet of the document placed on the document input tray 3 to the document glass 11, and a document output tray 4 for ejecting the document whose image has been optically read. The image reading portion 10 is also provided with a non-illustrated scanner.

The scanner is provided with an exposure lamp for irradiating the document with light, a reflection mirror for deflecting the light reflected from the document, a mirror for changing the optical path from the reflection mirror, a lens for gathering the reflected light, and a photoelectric converter such as three separate Charge-Coupled Devices (CCDs) for generating electric signals based on the received reflected light. The electric signals are conveyed to the image producing portion 20.

A document placed on the document input tray 3 is fed by the document feeder 2 and is placed on the document glass 11. The scanner is moved by a scanner motor in parallel with the document glass 11. Thereby, the scanner performs exposure scanning on an image depicted on the document placed on the document glass 11.

The image producing portion 20 is operable to produce an image onto paper by electrophotography. The image producing portion 20 is provided with an intermediate transfer belt 31 onto which a toner image is to be transferred, rollers 32, 33, and 34, imaging units 21Y, 21M, 21C, and 21K, transfer rollers 25Y, 25M, 25C, and 25K corresponding to the imaging units 21Y, 21M, 21C, and 21K, respectively, and a cleaner 29.

An imaging unit is configured of the imaging units 21Y, 21M, 21C, and 21K that correspond to four colors of Y (yellow), M (magenta), C (cyan), and K (black), respectively. The imaging units 21Y, 21M, 21C, and 21K are disposed in the stated order along the intermediate transfer belt 31. The imaging units 21Y, 21M, 21C, and 21K include photoconductive drums 22Y, 22M, 22C, and 22K, and developer units 23Y, 23M, 23C, and 23K, respectively.

The developer units 23Y, 23M, 23C, and 23K develop latent images formed on the surfaces of the photoconductive drums 22Y, 22M, 22C, and 22K onto which electrostatic latent images have been formed by using toners having the individual colors.

The cleaner 29 serves to remove toner remaining on the intermediate transfer belt 31 after secondary transfer.

The intermediate transfer belt 31 is supported by the rollers 32, 33, and 34 to remove slack from the intermediate transfer belt 31. When the rollers 32, 33, and 34 are rotationally driven, the intermediate transfer belt 31 runs in the direction of the arrow M2. The photoconductive drums 22Y, 22M, 22C, and 22K onto which toner images are formed are provided to face the transfer rollers 25Y, 25M, 25C, and 25K, respectively. The intermediate transfer belt 31 runs between the photoconductive drums 22Y, 22M, 22C, and 22K and the transfer rollers 25Y, 25M, 25C, and 25K. Thereby, toner images of the individual colors are transferred in order on the surface of the intermediate transfer belt 31 (primary transfer) in such a manner that the individual transfer positions (of the toner images) overlap each other.

The paper storage portion 40 is provided with a paper cassette 41 for storing sheets of paper as a printing medium, a pickup roller 42 for taking a sheet of paper out of the paper cassette 41, and a delivery roller 43.

The paper conveying portion 30 is provided with a secondary transfer roller 35, a fixing unit 36, a roller 37, and a paper output tray.

The pickup roller 42 takes out sheets of paper, one by one, in the paper cassette 41. The delivery roller 43 conveys the sheet of paper thus taken out to a transfer path HR. The sheet of paper conveyed to the transfer path HR is delivered in the direction of the arrow M1.

The sheet of paper is conveyed synchronously with the movement of the intermediate transfer belt 31, and comes into contact with, at the transfer nip, the intermediate transfer belt 31 onto which the toner image has been formed. When a bias voltage is applied to the secondary transfer roller 35, the toner image on the intermediate transfer belt 31 is transferred onto the sheet of paper (secondary transfer). The sheet of paper onto which the toner image has been transferred through the secondary transfer is carried to the fixing unit 36. The toner remaining on the intermediate transfer belt 31 is removed by the cleaner 29.

The fixing unit 36 has two rollers that are so provided to face each other and form a nip therebetween. One of the rollers is heated by a heater contained therein.

Heat is applied to the sheet of paper onto which the toner image has been formed at the nip between the rollers of the fixing unit 36. The heat fuses the toner, so that the toner image is fixed onto the sheet of paper. Note that a heat source (heater) contained in the roller is not illustrated. The heat source may be a halogen heater, for example.

The sheet of paper onto which the toner image has been fixed is delivered on the transfer path HR, and the roller 37 outputs the sheet of paper to the paper output tray 38.

[Power Control in Image Forming Apparatus 1]

The following is a description of power control in the image forming apparatus 1.

Figure 2:
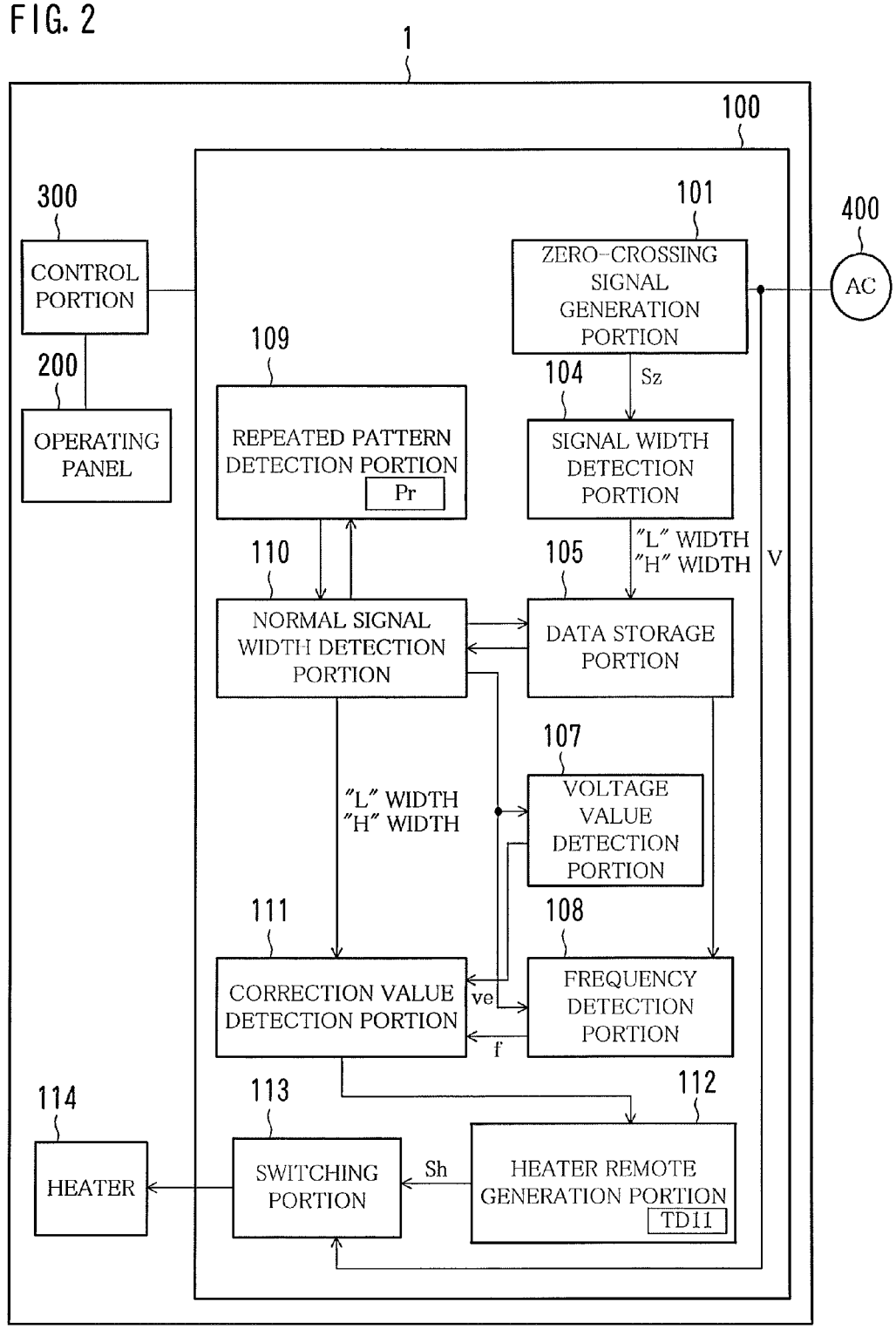
FIG. 2 is a block diagram showing a part relating to power control performed in an image forming apparatus.

FIG. 2 is a block diagram showing a part relating to power control on a fixing heater performed in the image forming apparatus 1.

Referring to FIG. 2, the image forming apparatus 1 is configured of a control portion (system control portion) 300, an operating panel 200, a power control portion 100, a heater 114 as one of AC loads, and so on.

The image forming apparatus 1 is connected to an AC power supply 400. The AC power supply 400 supplies utility AC power to the image forming apparatus 1. The AC power supplied to the image forming apparatus 1 is fed to the heater 114 through the power control portion 100.

The control portion 300 is implemented by, for example, a CPU, an MPU, a ROM, a RAM, an interface circuit, other peripheral circuits, or a hardware circuit. The control portion 300 is operable to control operations of the individual portions of the image forming apparatus 1 by giving commands to the individual portions. In short, the control portion 300 is informed of operating states of the individual portions through signals sent therefrom, entirely manages the operations of the individual portions, and have control thereover.

The operating panel 200 is used for an operator to give operation commands to the image forming apparatus 1 or to enter setting conditions thereinto. The operating panel 200 is provided with a variety of buttons, a display, and so on. The operator uses the operating panel 200 to enter a reference frequency fr and a reference voltage value (reference effective value) ver of an AC power supply for the location where the image forming apparatus 1 is installed. The reference frequency fr and the reference voltage value ver are a frequency f and a voltage value ve that are supposed to be supplied from the AC power supply 400 for the location where the image forming apparatus 1 is installed, namely, a nominal frequency and a nominal voltage value.

Alternatively, it is also possible to obtain a reference frequency fr and a reference voltage value ver from an appropriate detection circuit, or obtain the same from an appropriate server via a communication circuit, instead of the arrangement where the operator enters a reference frequency fr and a reference voltage value ver.

The heater 114 is mounted inside a roller of the fixing unit 36 and is operable to heat the roller. In this embodiment, the heater 114 is a halogen heater. Instead of this, however, the heater 114 may be implemented by a carbon heater, an electrically-heated wire, a ceramic heater, an Induction Heating (IH) coil, or the like.

In this embodiment, the power control portion 100 performs power control on the image producing portion 20. To be specific, the power control portion 100 generates a zero-crossing signal Sz which indicates a first level if the absolute value of AC voltage from the AC power supply 400 is equal to or smaller than a predetermined value, and indicates a second level if the absolute value is larger than the predetermined value.

The zero-crossing signal Sz may be a binary signal in which, for example, the first level is set at an L level and the second level is set at an H level. The L level and the H level are relative to each other. Thus, either one of the L level and the H level may be positive and the other may be negative.

Then, a zero-crossing width and a non-zero-crossing width of the zero-crossing signal Sz are detected. The zero-crossing width is a time width of the zero-crossing signal Sz for a case where the absolute value of AC voltage is equal to or smaller than the predetermined value. The non-zero-crossing width is a time width thereof for a case where the absolute value of AC voltage is equal to or larger than the predetermined value. Further, based on the zero-crossing width and the non-zero-crossing width thus detected, a frequency and a voltage value of the AC voltage are detected. Phase control is performed depending on the detected frequency and voltage value of the AC voltage.

For example, a zero-crossing signal Sz is generated for each half cycle of AC based on a waveform of voltage from the AC power supply 400. Then, an "L" width (zero-crossing width) that is a time width of a Low signal and an "H" width (non-zero-crossing width) that is a time width of a High signal are detected based on the zero-crossing signal Sz.

The frequency f and the voltage value ve of the AC power supply 400 are determined based on the "L" width and the "H" width, or, alternatively, based on a period Th that is the sum of the "L" width and the "H" width. An edge interval for each of the "L" width and the "H" width is also detected. An internal timer is started based on the detection results. At a time when a predetermined time set on the internal timer elapses, a heater remote signal Sh is generated, and phase control is performed on the heater 114. The detailed descriptions are given later.

The power control portion 100 is configured of a zero-crossing signal generation portion 101, a signal width detection portion 104, a data storage portion 105, a voltage value detection portion 107, a frequency detection portion 108, a repeated pattern detection portion 109, a normal signal width detection portion 110, a correction value detection portion 111, a heater remote generation portion 112, a switching portion 113, and so on. The power control portion 100 is implemented by, for example, a CPU, an MPU, a RAM, a ROM, an I/O device, another electronic circuit device or electronic circuit.

The zero-crossing signal generation portion 101 produces a zero-crossing signal Sz based on AC voltage V from the AC power supply 400.

Figure 3:
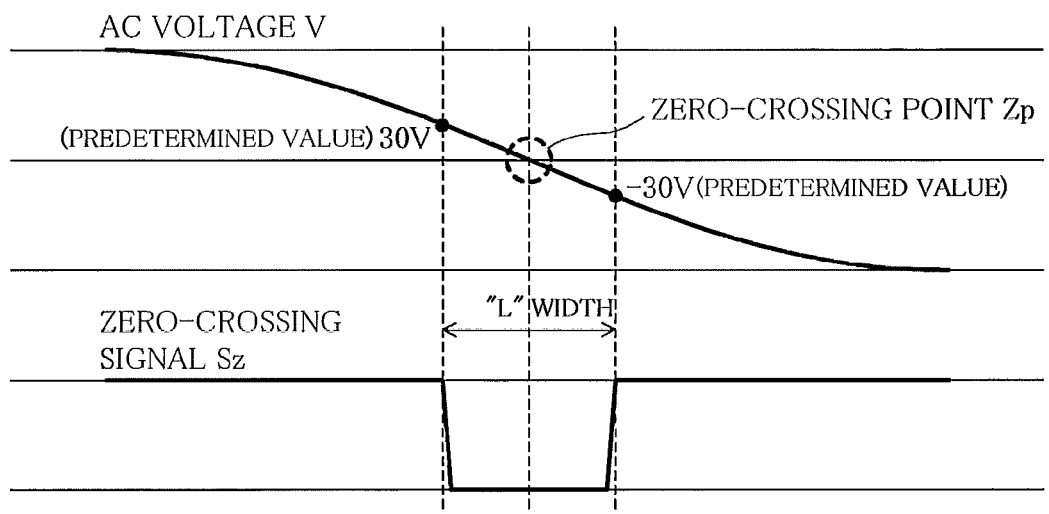
FIG. 3 is a diagram depicting an example of a method for generating a zero-crossing signal.

FIG. 3 is a diagram showing an example as to how to generate a zero-crossing signal Sz. The upper half of FIG. 3 shows AC voltage V while the lower half thereof shows a zero-crossing signal Sz.

The zero-crossing signal generation portion 101 generates a zero-crossing signal Sz by outputting a Low signal for a case where the absolute value of AC voltage V is equal to or smaller than a predetermined value, and by outputting a High signal for the other cases. In this way, the zero-crossing signal Sz is determined to be Low or High depending on whether or not the AC voltage V has a value equal to or smaller than the predetermined value. Note that, in this embodiment, the zero-crossing signal Sz is Low for a case where the absolute value of the AC voltage V is equal to or smaller than 30 V. In such a case, 30 V is an example of the predetermined value. The zero-crossing point Zp lies in the middle of "L" width (zero-crossing width) that is a time width of the Low signal L.

In a state where phase control such as through up-regulation or through down-regulation is performed, noise possibly appears in AC voltage V. Accordingly, a zero-crossing signal Sz generated during such phase control probably has a false Low signal L. A method for dealing with this will be described later.

It is possible to invert the Low signal L and the High signal in the zero-crossing signal Sz in such a manner that the High signal passes through the zero-crossing point.

The signal width detection portion 104 detects an "L" width (zero-crossing width) that is a time width of a Low signal L in the zero-crossing signal Sz, and an "H" width (non-zero-crossing width) that is a time width of a High signal H therein. To be specific, the signal width detection portion 104 detects an interval between a falling edge and a rising edge of the zero-crossing signal Sz, and an interval between a rising edge and a falling edge of the zero-crossing signal Sz.

The data storage portion 105 stores, in chorological order, true "L" widths and "H" widths detected by the normal signal width detection portion 110. The data storage portion 105 also stores, therein, repeated patterns, "L" widths, and "H" widths that are detected by the signal width detection portion 104 and are required at the time of detection of various values.

The voltage value detection portion 107 detects a voltage value ve of AC voltage V based on the true "L" widths and "H" widths detected by the normal signal width detection portion 110.

The frequency detection portion 108 detects a frequency f of AC voltage V based on the true "L" widths and "H" widths detected by the normal signal width detection portion 110.

The repeated pattern detection portion 109 detects a repeated pattern Pr for an "L" width, an "H" width, and a period Th that is the sum of the "L" width and the "H" width adjacent to each other. The repeated pattern Pr is used to detect (check) whether or not the zero-crossing signal Sz contains a Low signal L caused by noise.

The repeated pattern Pr shows the entirety of the individual averages of periods Th, and "L" widths and "H" widths having no noise in the zero-crossing signal Sz. Note that each of the individual averages of the periods Th, the "L" widths, and the "H" widths, and is sometimes referred to as the repeated pattern Pr.

To be specific, the repeated pattern Pr includes a reference zero-crossing width that is used as the reference of zero-crossing width, and a reference non-zero-crossing width that is used as the reference of non-zero-crossing width. The reference zero-crossing width and the reference non-zero-crossing width are generated based on a zero-crossing width and a non-zero-crossing width in AC voltage Vc where no noise appears.

The initial repeated pattern Pr is generated from the individual averages of a plurality of (e.g., five) "L" widths, of a plurality of (e.g., five) "H" widths, and of a plurality of (e.g., five) periods Th, based on a zero-crossing signal Sz obtained under an initial state where the image forming apparatus 1 starts up, i.e., a state where noise is less likely to occur. Thereafter, as for a zero-crossing signal Sz obtained appropriately, averages are calculated with the periods Th, the "L" widths, and the "H" widths, having no noise. Thereby, the repeated pattern Pr is updated.

Detailed descriptions are given later of an example of the repeated pattern Pr, as to how to generate the repeated pattern Pr, and as to how to update the repeated pattern Pr.

The normal signal width detection portion 110 determines whether each of the "L" width and the "H" width of the zero-crossing signal Sz is a true width not affected by noise, or, is a false width due to noise. The normal signal width detection portion 110 thereby detects a true "L" width and a true "H" width.

The correction value detection portion 111 detects a voltage value (effective value) ve of AC voltage V based on the frequency f detected by the frequency detection portion 108 and the true "L" width and "H" width detected by the normal signal width detection portion 110. The correction value detection portion 111 then compares the detected frequency f and the detected voltage value ve with the reference frequency fr and the reference voltage value ver, so that a correction value for appropriate phase control is detected.

In this embodiment, an effective value is used as the voltage value ve. Instead of this, a voltage value that is not an effective value, e.g., a maximum value, may be used as the voltage value ve. The voltage value ve is not necessarily a value directly indicating an actual voltage value, and may be data related to the voltage value. Likewise, the frequency f is not necessarily a value directly indicating an actual frequency value, and may be data related to the frequency value.

The heater remote generation portion 112 generates, based on the correction value detected by the correction value detection portion 111, a heater remote signal Sh for controlling the operation of the switching portion 113. The heater remote generation portion 112 generates the heater remote signal Sh in response to a command to operate the heater 114 from the control portion 300.

The heater remote signal Sh is turned OFF synchronously with a Low signal L of the zero-crossing signal Sz, and, after a predetermined lapse of OFF time (standby time), is turned ON. Data TD11 indicating the standby time is held by the heater remote generation portion 112, or, can be read by the heater remote generation portion 112.

In response to the heater remote signal Sh turned ON, the switching portion 113 is turned ON, which allows heater current Ih to flow into the heater 114. Since the heater current Ih has an AC waveform, the value thereof becomes zero within a half cycle. The heater current Ih keeps flowing until the value thereof becomes zero.

The switching portion 113 is implemented by a thyristor, a bi-directional thyristor, an IGBT, another switching device capable of performing phase control, or the like. The switching portion 113 is turned ON or OFF based on the heater remote signal Sh, thereby to control power supply to the heater 114.

Further detailed descriptions are provided below.

[AC Voltage and other Signal Waveforms]

Figure 4:
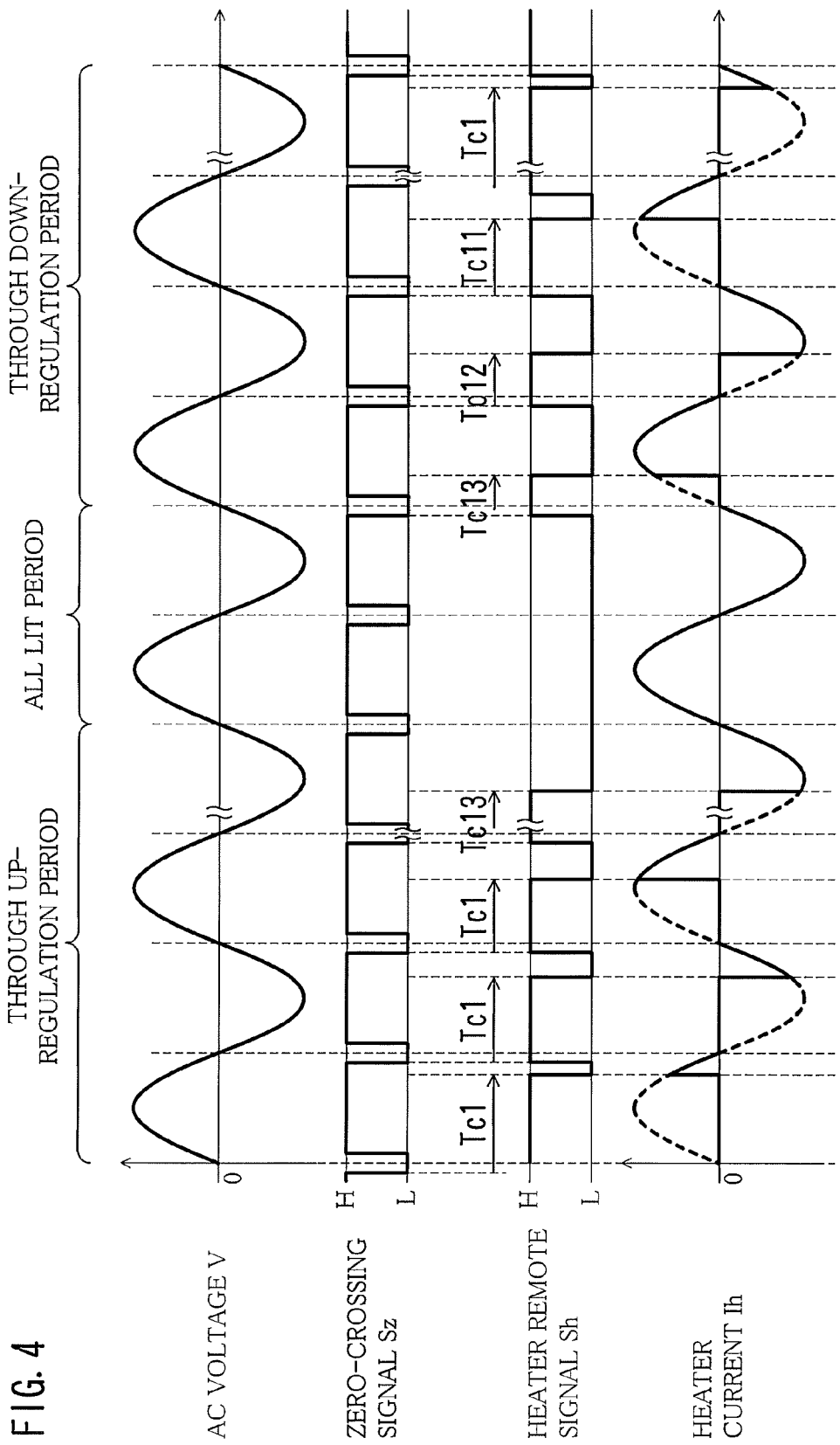
FIG. 4 is a diagram showing an example of waveforms of individual portions for a case where a power control portion performs entire control.
Figure 5:
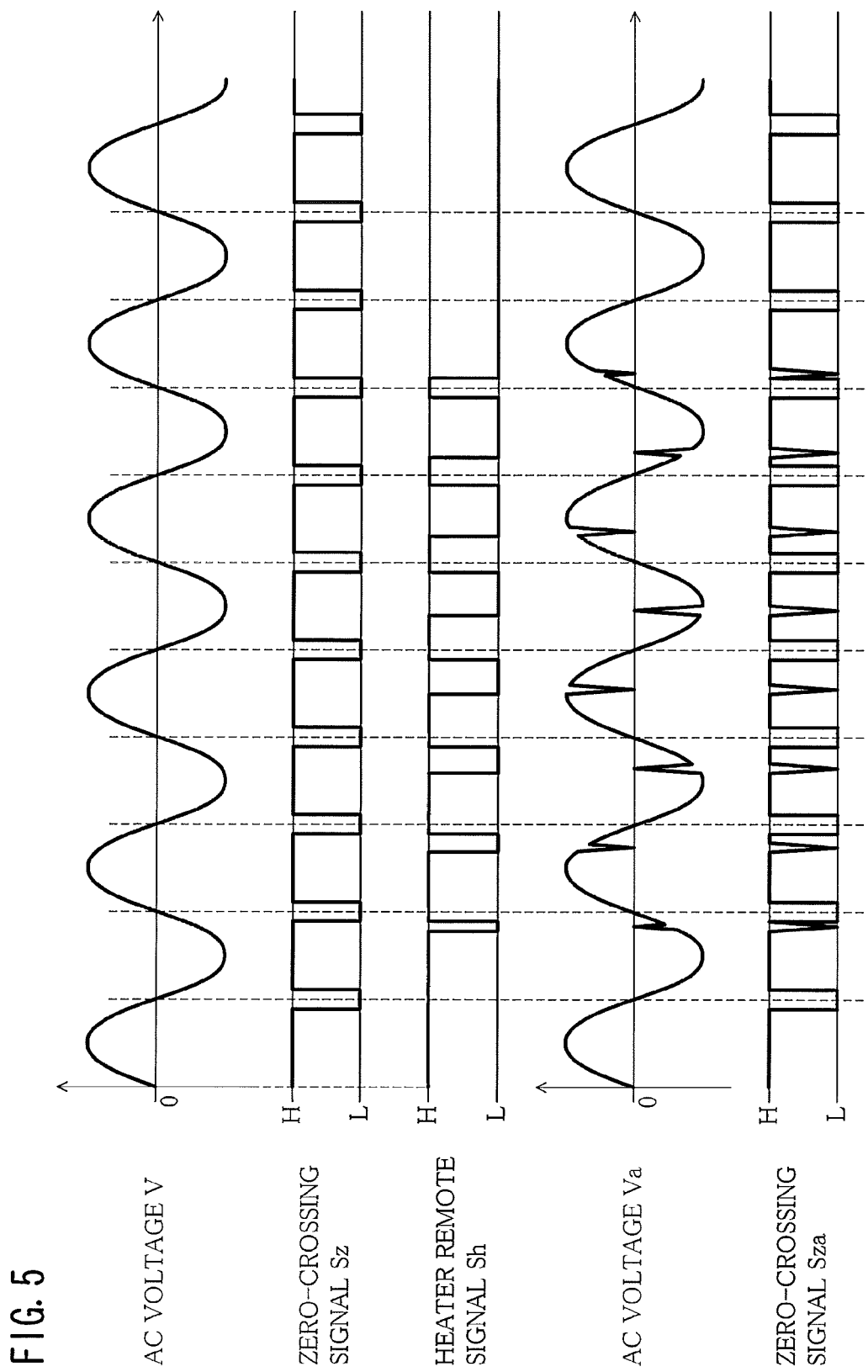
FIG. 5 is a diagram showing an example of waveforms of individual portions for a case where noise is present in an AC power supply.

FIG. 4 is a diagram showing an example of waveforms of individual portions for a case where the power control portion 100 performs entire control, and FIG. 5 is a diagram showing an example of waveforms of individual portions for a case where noise is present in the AC power supply 400. In FIG. 5, the upper AC voltage shows a waveform for a case where no noise is present in the AC power supply 400, and the lower AC voltage Va shows a waveform for a case where noise is present therein.

Referring to FIG. 4, the AC voltage V is shown which is supplied to the heater 114 serving as an AC load in the image forming apparatus 1. The zero-crossing signal Sz is a signal that is Low during a predetermined period before and after a zero-crossing point of the AC voltage V, and is High during a period other than the predetermined period.

The heater remote signal Sh is a signal for designating a period of time during which current passes through the heater 114. To be specific, the heater remote signal Sh is a signal for controlling ON/OFF of a switching device implemented by, for example, a bi-directional thyristor. The heater remote signal Sh goes Low (active) after a predetermined lapse of time since the zero-crossing signal Sz corresponding to the starting point of each half cycle of AC voltage went Low.

When the heater remote signal Sh goes Low, the switching device is turned ON, so that input current Ih starts to flow into the heater. The heater remote signal Sh goes High the next time when the zero-crossing signal Sz goes Low, and again, after a predetermined lapse of time, the heater remote signal Sh goes Low. The passage of current through the heater 114 stops for each endpoint (zero point) of a half cycle of AC voltage, independently of a time at which the heater remote signal Sh goes High.

Standby time (elapsed time) from when the zero-crossing signal Sz goes Low to when the heater remote signal Sh goes Low changes gradually. To be specific, the standby time gradually reduces for the case of through up-regulation. In contrast, the standby time gradually increases for the case of through down-regulation.

Thereby, in the through up-regulation, power supplied to the heater gradually increases, and, in the through down-regulation, power supplied to the heater gradually reduces. The standby time from when the zero-crossing signal Sz goes Low to when the heater remote signal Sh goes Low is indicated in FIG. 6.

To be specific, FIG. 6 shows data TD11 indicating standby time in through up-regulation or through down-regulation for cases where AC voltage has a frequency of 50 Hz and where AC voltage has a frequency of 60 Hz. The standby time indicated in the data TD11 is set in the internal timer of the power control portion 100. In this embodiment, the phase angle $\phi$ and the conduction angle in the switching portion 113 is variable depending on the time set in the internal timer.

Referring to FIG. 6, the standby time changes, for each half cycle of AC voltage, from Tc1 to Tc13 in order for the through up-regulation, and changes from Tc13 to Tc1 in order for the through down-regulation.

As discussed earlier, the through up-regulation and the through down-regulation enable stable control on the heater.

If no noise occurs in the AC voltage V, no false Low signal L is generated in the zero-crossing signal Sz, which means that the "L" width and the "H" width detected by the signal width detection portion 104 have true values. When the true "L" width and the true "H" width can be detected in this manner, not only the frequency of AC voltage V but the voltage value thereof can be found based on the true "L" width and the true "H" width.

Note that, as the data for the through up-regulation or the through down-regulation, other data such as data TD3-TD6 described later with reference to FIGS. 12A-12D may be used.

Referring to FIG. 5, AC voltage Va shown in the lower part thereof is AC voltage where noise occurs due to the heater remote signal Sh. Based on the AC voltage Va, a zero-crossing signal Sza is generated. The zero-crossing signal Sza has noise. As is seen from the comparison of the zero-crossing signal Sza and the zero-crossing signal Sz, the former has more zero-crossing points (Low signal states) than the latter.

The zero-crossing signal Sza has Low signals generated due to noise. Accordingly, if phase control is performed synchronously with the zero-crossing signal Sza, the phase control is not performed correctly.

FIGS. 7A-7D show examples of a false zero-crossing signal Sz generated due to noise.

As shown in FIGS. 7A-7D, in addition to true Low signals L1 and L2, false Low signals are generated. The false Low signals are generated during a zero-crossing signal interval between the true Low signal L1 and the true Low signal L2.

Figure 7A:
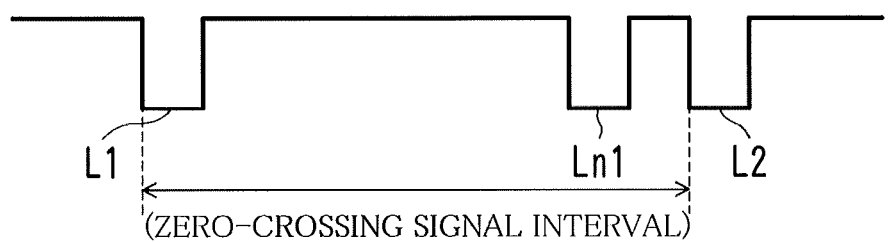
FIGS. 7A-7D are diagrams showing examples of a false zero-crossing signal caused due to noise.

In the example of FIG. 7A, a false Low signal Ln1 is generated between the true Low signal L1 and the true Low signal L2. The false Low signal Ln1 is probably recognized as a Low signal.

Figure 7B:
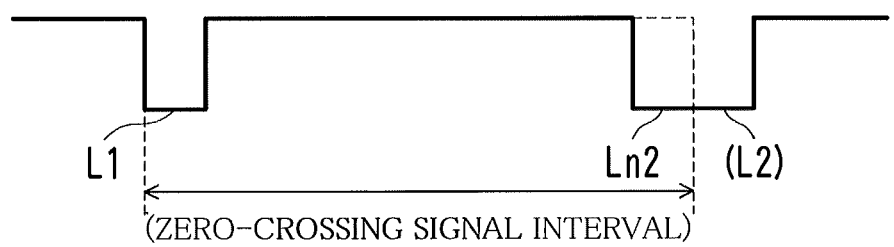

In the example of FIG. 7B, the true Low signal L2 overlaps a false Low signal, so that a false Low signal Ln2 with a large width is generated. The false Low signal Ln2 is probably recognized as one Low signal.

Figure 7C:
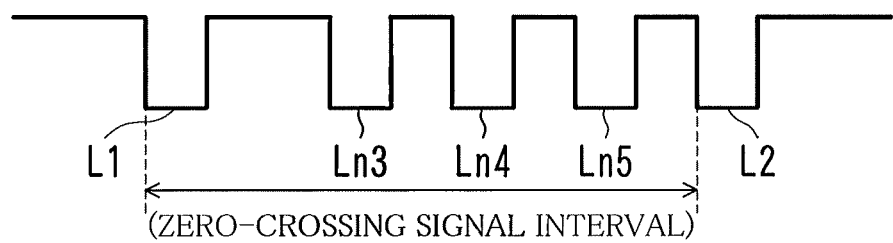

In the example of FIG. 7C, false Low signals Ln3, Ln4, and Ln5 are generated between the true Low signal L1 and the true Low signal L2. Each of the false Low signals Ln3, Ln4, and Ln5 is probably recognized as a Low signal.

Figure 7D:
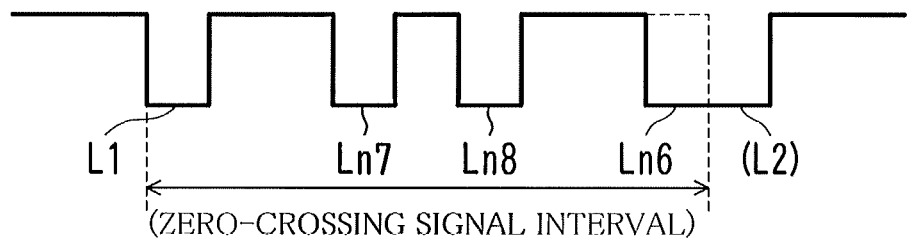

In the example of FIG. 7D, false Low signals are generated between the true Low signal L1 and the true Low signal L2. Further, one of the false Low signals overlaps the true Low signal L2, so that a Low signal Ln6 with a large signal width is generated. False Low signals Ln7 and Ln8 are generated between the true Low signal L1 and the false Low signal Ln6. Each of the false Low signals Ln6, Ln7, and Ln8 is probably recognized as a Low signal.

To cope with this, the power control portion 100 according to this embodiment is configured to, even if such false Low signals Ln1-Ln6 due to noise are generated, perform phase control based on the true Low signals L1 and L2 without recognizing the false Low signals Ln1-Ln6 as Low signals.

The following is a description of a method for determining a voltage value of AC voltage V by using a true "L" width and a true "H" width.

[Method for detecting true "L" width and true "H" width with influence of noise removed]

First, a method for detecting a true "L" width and a true "H" width in a zero-crossing signal Sz is described.

Figure 8A:
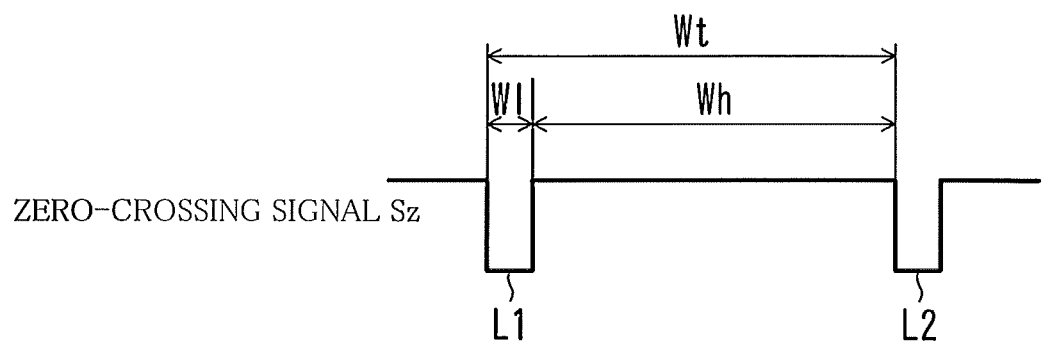
FIGS. 8A and 8B are diagrams showing an example of a true zero-crossing signal and a repeated pattern, respectively.
Figure 8B:
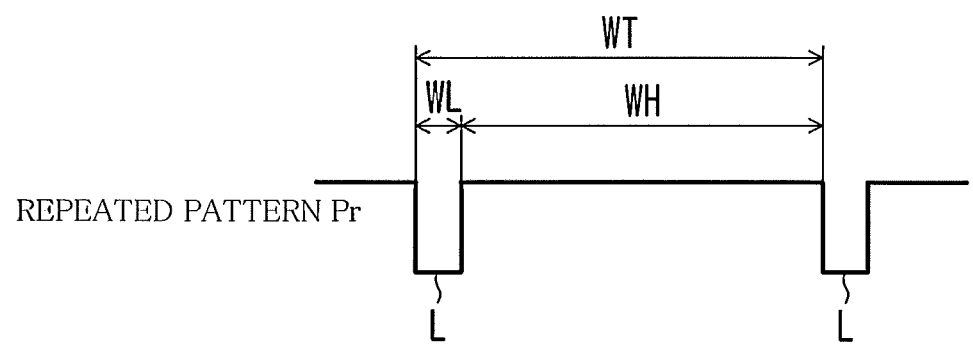

FIGS. 8A and 8B show an example of a true zero-crossing signal Sz and a repeated pattern Pr, respectively.

As shown in FIG. 8A, the true zero-crossing signal Sz has a Low signal width ("L" width) of Wl, a High signal width ("H" width) of Wh, and a period width of Wt.

As shown in FIG. 8B, the repeated pattern Pr has a Low signal width ("L" width) of WL, a High signal width ("H" width) of WH, and a period width of WT.

A zero-crossing signal Sz generated by the zero-crossing signal generation portion 101 is compared with the repeated pattern Pr. If the difference between the Low signal width W1 and the Low signal width WL, the difference between the High signal width Wh and the High signal width WH, and the difference between the period width Wt and the period width WT fall within the individual predetermined ranges, then it is determined that the generated zero-crossing signal Sz is a true zero-crossing signal Sz. Otherwise, it is determined that the generated zero-crossing signal Sz is a false zero-crossing signal Sz.

To be specific, if the individual conditions of the following expression (1) are satisfied, then the Low signal width, the High signal width, and the period width are determined to be true. Then, phase control is performed based on timing of the true Low signal or the true High signal.

$$|WL-Wl|<\alpha1$$

$$|WH-Wh|<\alpha2$$

$$|WT-Wt|<\alpha3 \quad (1)$$

If the individual conditions of the foregoing expression (1) are not satisfied, then the Low signal width, the High signal width, and the period width are determined to be false. Then, processing for detecting a true Low signal or a true High signal continues.

The detailed descriptions are provided below. An "L" width evaluation method is discussed first.

The normal signal width detection portion 110 compares an "L" width detected this time by the signal width detection portion 104 with the "L" width WL of the repeated pattern Pr. If a match is found therebetween, then the "L" width detected this time is added to the true "H" width detected the last time (called temporary "H" width), and the resultant is compared to the period WT of the repeated pattern Pr. If a match is found therebetween, then it is determined that the "L" width detected this time is true. Note that the true "H" width detected the last time is read out from the data storage portion 105.

On the other hand, if the "L" width detected this time does not match the "L" width WL of the repeated pattern Pr, then the combination of the "L" width detected this time and the true "H" width detected the last time is compared to the period WT of the repeated pattern Pr. If a match is found therebetween, then it is determined that the "L" width detected this time is true. Otherwise, an "L" width ratio and an "H" width ratio in the "L" width detected this time and the true "H" width detected the last time respectively are calculated. If the resultant value is equal to the value of the reference frequency fr, then it is determined that the "L" width detected this time is true. Otherwise, it is determined that the "L" width detected this time is false.

Even if the "L" width detected this time does not match the "L" width WL of the repeated pattern Pr, it is determined that the "L" width detected this time is true as long as the combination of the "L" width detected this time and the true "H" width detected the last time matches the period WT of the repeated pattern Pr. Otherwise, an "L" width ratio and an "H" width ratio in the "L" width detected this time and the true "H" width detected the last time respectively are calculated. If the resultant value is equal to the value of the reference frequency fr, then it is determined that the "L" width detected this time is true. Otherwise, it is determined that the "L" width detected this time is false.

If the "L" width is determined to be false, then another determination is made as to whether or not the false L signals L overlap the true L signal L to form one L signal L.

Next, an "H" width evaluation method is discussed.

The normal signal width detection portion 110 compares an "H" width detected this time (called temporary "H" width) by the signal width detection portion 104 with the "H" width WH of the repeated pattern Pr. If a match is found therebetween, then the "H" width detected this time is added to the true "L" width detected the last time (called normal "L" width), and the resultant is compared to the period WT of the repeated pattern Pr. If a match is found therebetween, then it is determined that the "H" width detected this time is true. Note that the true "L" width detected the last time is read out from the data storage portion 105.

On the other hand, if the "H" width detected this time does not match the "H" width WH of the repeated pattern Pr, then the combination of the "H" width detected this time and the true "L" width detected the last time is compared to the period WT of the repeated pattern Pr. If a match is found therebetween, then it is determined that the "H" width detected this time is true. Otherwise, an "H" width ratio and an "L" width ratio in the "H" width detected this time and the true "L" width detected the last time respectively are calculated. If the resultant value is equal to the value of the reference frequency fr, then it is determined that the "H" width detected this time is true. Otherwise, it is determined that the "H" width detected this time is false.

Even if the "H" width detected this time does not match the "H" width WH of the repeated pattern Pr, it is determined that the "H" width detected this time is true as long as the combination of the "H" width detected this time and the true "L" width detected the last time matches the period WT of the repeated pattern Pr. Otherwise, an "H" width ratio and an "L" width ratio in the "H" width detected this time and the true "L" width detected the last time respectively are calculated. If the resultant value is equal to the value of the reference frequency fr, then it is determined that the "H" width detected this time is true. Otherwise, it is determined that the "H" width detected this time is false.

Although the foregoing description says that a match is found between time widths, the time widths do not always have to be completely equal to each other. The time widths may include some tolerances. The same is similarly applied to the case of variation ratio. To be specific, the variation ratios do not always have to be completely equal to each other. The variation ratios may include some tolerances.

The following is a description of a specific process for detecting a true Low signal or High signal from a false zero-crossing signal Sz with reference to FIGS. 9A-10C.

FIGS. 9A-9D show an example of processing for detecting a true Low signal or High signal from the zero-crossing signal Sz shown in FIG. 7A.

Figure 9A:
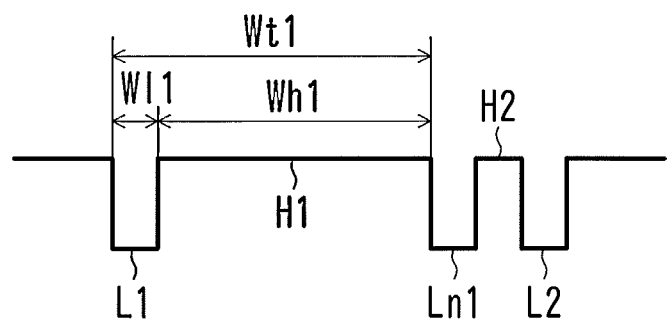
FIGS. 9A-9D are diagrams showing an example of processing for detecting a true Low signal, and so on from a zero-crossing signal.

In FIG. 9A, a width W11 of a Low signal L1 is compared with a width WL of a Low signal L for the repeated pattern Pr. The comparison result shows that the width W11 and the width WL are equal to each other, in other words, the difference therebetween falls within a predetermined range. It is, therefore, determined that the Low signal L1 is true. Thereby, timing of the Low signal L1, e.g., timing of the rising edge or the falling edge thereof is used in real time as necessary for various control operation.

Then, a width Wh1 of a High signal is compared with a width WH of a High signal for the repeated pattern Pr. Since a Low signal Ln1 is generated due to noise, the width Wh1 is substantially smaller than the width WH. For this reason, the individual conditions of the foregoing expression (1) are not satisfied. It is therefore determined that the High signal H1 is false, and the High signal H1 is not used for control operation.

Figure 9B:
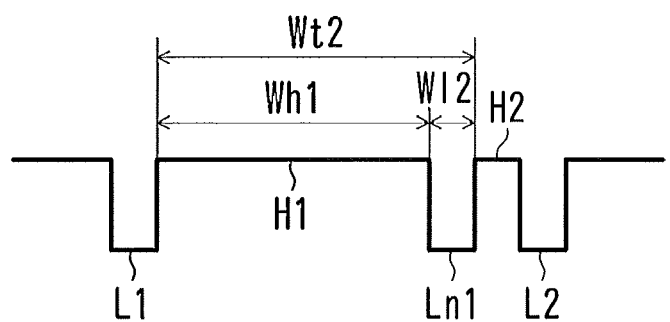

In FIG. 9B, a width W12 of the Low signal Ln1 is compared with the width WL of the Low signal L for the repeated pattern Pr. If the comparison result shows that the width W12 and the width WL are equal to each other, then a period width Wt2 that is the combination of the width W12 of the Low signal Ln1 and the width Wh1 of the High signal H1 is compared with a period WT for the repeated pattern Pr. The comparison result shows that the width Wt2 is substantially smaller than the period WT, so that the individual conditions of the foregoing expression (1) are not satisfied. It is therefore determined that the Low signal Ln1 is false and the Low signal Ln1 is not used for control.

The "width Wh1" of the High signal H1 that has been determined to be a false width is not a true width, and is temporarily used to check the next Low signal L1. The width Wh1 is thus referred to as a "temporary width" in some cases. Further, even if a width has been determined to be a true width, such a width is sometimes referred to as a "temporary width" when it is used temporarily to check the next signal.

Figure 9C:
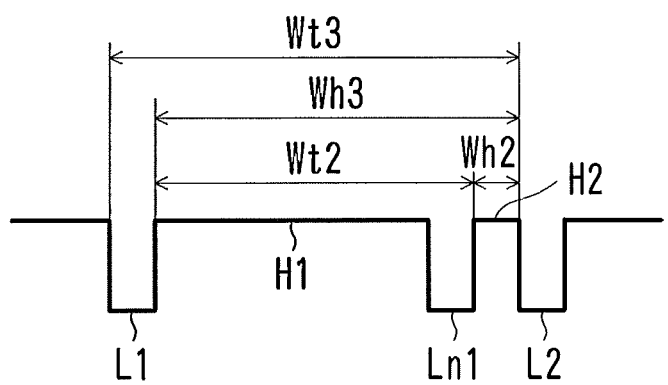

After that, in FIG. 9C, a width Wh3 that is the combination of a width Wh2 of a High signal H2 and the period width Wt2 is compared with the width WH of the High signal for the repeated pattern Pr. Since the width Wh3 and the width WH are equal to each other, it is determined that the width Wh3 is true. Thus, at this point, the endpoint of the width Wh3, i.e., the falling edge of the next Low signal L2 is used as a trigger for starting to count the time by the internal timer.

Figure 9D:
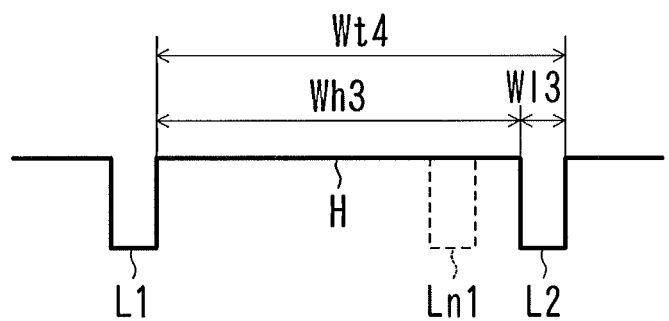

Then, in FIG. 9D, a width W13 of the Low signal L2 is compared with the width WL of the Low signal L for the repeated pattern Pr. Since the width W13 and the width WL are equal to each other, it is determined that the Low signal L2 is true.

In essence, the width Wh3 has been determined to be true, and, at the same time, the width W13 has been determined to be true. Thus, the Low signal L2 is found to be a true Low signal.

The combination of a width of a High signal and a width of a Low signal is equal to a period width of the signal. Therefore, check may be made by using any two of the three variables to the extent possible.

In FIG. 9D, for example, the width W13 of the Low signal L2 is compared with the width WL of the Low signal L for the repeated pattern Pr. Instead of this, however, a period WT4 that is the combination of the width W13 of the Low signal L2 and the width Wh3 may be compared with the period WT for the repeated pattern Pr.

Figure 10A:
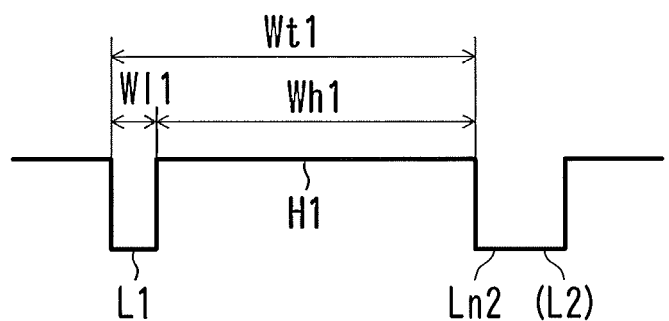
FIGS. 10A-10C are diagrams showing an example of processing for detecting a true Low signal, and so on from a zero-crossing signal.
Figure 10B:
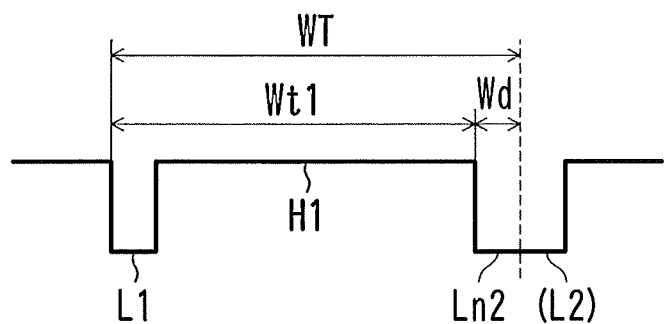
Figure 10C:
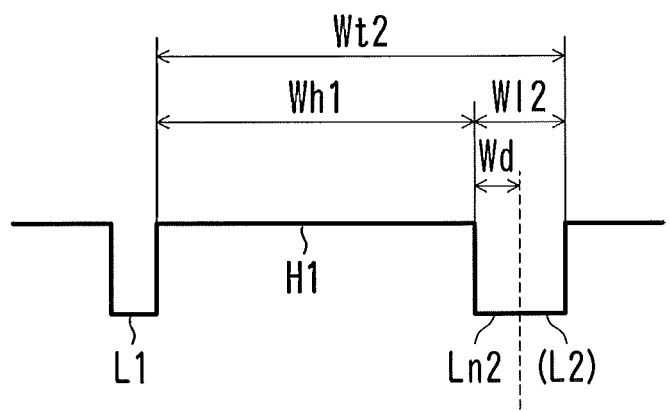

FIGS. 10A-10C show an example of processing for detecting a true Low signal or High signal from the zero-crossing signal Sz shown in FIG. 7B.

In FIG. 10A, a width W11 of a Low signal L1 is compared with a width WL of a Low signal L for the repeated pattern Pr. Since the width W11 and the width WL are equal to each other, it is determined that the Low signal L1 is true.

Then, a width Wh1 of a High signal H1 is compared with a width WH of a High signal for the repeated pattern Pr. Since a Low signal Ln2 is generated due to noise, the width Wh1 is smaller than the width WH. For this reason, the individual conditions of the foregoing expression (1) are not satisfied. It is therefore determined that the High signal H1 is false, and the High signal H1 is not used for control operation.

In FIG. 10B, the difference between the period WT for the repeated pattern Pr and a period Wt1 that is the combination of the width W11 and the width Wh1, namely, the residual "H" width Wd is calculated. Then, the residual "H" width Wd is compared with the width WL. If the residual "H" width Wd is equal to or smaller than the width WL, then an "L" width W12 to be detected next to the "H" width Wh1 is probably a time width of a Low signal generated by overlapping noise and a true Low signal. If the residual "H" width Wd is equal to or smaller than the width WL, and if the "L" width W12 to be detected next is a false width, then the "L" width W12 is a width of a Low signal generated by overlapping noise and a true Low signal. The "L" width WL2 is therefore determined to be a false width.

In FIG. 10C, the width W12 of the Low signal Ln2 is compared with the width WL. Since the width WL is substantially smaller than the width W12, the individual conditions of the foregoing expression (1) are not satisfied. It is therefore determined that the Low signal Ln2 is a false signal. Further, the Low signal Ln2 is determined to be a false signal generated by overlapping noise and a true Low signal because the residual "H" width Wd is equal to or smaller than the width WL.

Since the Low signal Ln2 is generated by overlapping noise and the true Low signal, it is difficult to determine timing of the falling edge of the true Low signal. With this being the situation, the timing of the falling edge of the true Low signal is set at a time at which time corresponding to the residual "H" width Wd has elapsed from the falling edge of the Low signal Ln2 for example.

In this embodiment, at the timing thus determined, the internal timer is started up to count the time.

The internal timer (OFF timer or ON timer) may be implemented by a CPU, MPU, or hardware circuit.

[Repeated Pattern Pr]

Descriptions are provided below of a method for detecting an "L" width WL, an "H" width WH, and a period WT for a repeated pattern Pr.

Noise is less likely to occur in AC voltage V before phase control is performed on the heater 114. In view of this, an average of five "L" widths and an average of five "H" widths detected by the signal width detection portion 104 in the initial stage where the image forming apparatus 1 is started up are calculated. Each of the averages thus calculated is regarded as an initial "L" width WL and an initial "H" width WH.

After the phase control is started, a true "L" width and a true "H" width detected by the normal signal width detection portion 110 are added to the initial "L" width WL and the initial "H" width WH respectively, and then the resultant values are divided by a variable K. Stated differently, averages thereof are calculated and the averages are updated as a new "L" width WL and a new "H" width WH.

The "L" width WL and "H" width WH for the repeated pattern Pr are updated in the foregoing manner. The variable K may be "2". To be specific, if the variable K is "2", for each update operation, an average of the previous "L" width WL and the new "L" width is simply calculated, and, an average of the previous "H" width WH and the new "H" width is simply calculated. Instead of such calculation, however, it is also possible to, for example, multiply the previous "L" width WL, the previous "H" width WH, the "L" width WL and "H" width WH detected this time by a coefficient, and calculate the individual averages by setting, as the variable K, a numerical value other than 2, e.g., 3, 4, 5, 10, and so on. It is also possible to increase the value of the variable K depending on the number of times of the update operation.

In the foregoing description, an average of five "L" widths and an average of five "H" widths are calculated to determine the initial "L" width WL and the initial "H" width WH. Instead of this, however, an average of ten "L" widths and an average of ten "H" widths, or, an average of twenty "L" widths and an average of twenty "H" widths may be calculated.

The period WT for the repeated pattern Pr may be determined as the sum of the "L" width WL and the "H" width WH that are adjacent to each other.

[Calculation of frequency and Voltage Value Based on "L" Width and "H" Width]

The following is a description of a method for calculating a frequency f and a voltage-value ve based on an "L" width and an "H" width obtained from a zero-crossing signal Sz.

FIGS. 11A and 11B show an example of data TD1 and TD2 used for calculating the frequency f and the voltage value ve based on the "L" width and "H" width.

To be specific, the data TD1 shown in FIG. 11A indicates a relationship of the "L" width and the "H" width with respect to change in voltage value (effective value) ve of AC voltage V. The data TD1 is used to determine a voltage value ve based on the "L" width, "H" width, or variation ratios thereof.

The data TD2 shown in FIG. 11B indicates a relationship of the "L" width and the "H" width with respect to change in frequency f of the AC voltage V. As shown in the data TD2, the ratio between the "L" width and the "H" width is constant even if the frequency f changes. A period that is the combination of the "L" width and the "H" width corresponds to a period of a half cycle. Accordingly, the frequency f can be calculated from the following expression (2).

$$f = \frac{1}{2}(\text{"}L\text{" width} + \text{"}H\text{" width}) \quad (2)$$

The data TD1 and data TD2 shown in FIGS. 11A and 11B are described.

The data TD1 indicates values of the "L" width and the "H" width detected from a zero-crossing signal Sz generated for a case where AC voltage V is 50 Hz and the voltage value ve is changed within a range of 80 v to 130 v. Note that, as the zero-crossing signal Sz, a zero-crossing signal Sz from which influence of noise is removed is used.

The data TD1 also indicates "L" width variation ratios and "H" width variation ratios with the "L" width and "H" width for a voltage value ve of 100 v used as the reference. The "L" width variation ratio represents, by percentage, "L" widths in various voltage values ve with reference to 100v. Likewise, the "H" width variation ratio represents, by percentage, "H" widths in various voltage values ve with reference to 100 v. Note that a minus value means reduction in voltage value compared to that for the reference voltage 100v.

For the cases of 100 v or more, a value obtained by subtracting an "L" width variation ratio from an "H" width variation ratio is shown as the variation ratio. For the cases of 100 v or less, a value obtained by adding an "L" width variation ratio and an "H" width variation ratio together is shown as the variation ratio.

The voltage variation ratio shows a rate of change of each voltage value with reference to 100 v.

As is clear from the data TD1, even if the AC voltage V varies, it is possible to estimate and detect a voltage value ve of the AC voltage V based on the variation ratio.

The data TD2 indicates values of the "L" width and the "H" width detected from a zero-crossing signal Sz generated for a case where AC voltage V has a voltage value ve of 100 v and a frequency is changed within a range of 40 Hz to 72 Hz. Note that, as the zero-crossing signal Sz, a zero-crossing signal Sz from which influence of noise is removed is used.

The data TD2 also indicates "L" width ratios and "H" width ratios with the combination of "L" width and "H" width for each frequency used as the reference. The "L" width ratio represents, by percentage, "L" widths in various frequencies with reference to the combination of the "L" width and "H" width. Likewise, the "H" width ratio represents, by percentage, "H" widths in various frequencies with reference to the combination of the "L" width and "H" width.

As is clear from the data TD2, even if the frequency f varies, each of the "L" width ratio and the "H" width ratio is constant as long as the voltage value ve of the AC voltage V does not change.

In view of the results shown in FIGS. 11A and 11B, when the frequency f and the voltage value ve of AC voltage V vary at the same time, first, it is checked whether or not the frequency f varies, and the varied frequency f is calculated. After that, the voltage value ve is calculated based on the foregoing variation ratios. As described earlier, combining the "L" width with the "H" width finds out a value corresponding to the half of a period of the AC voltage V. The value obtained can be used to find a frequency f of the AC voltage V.

[Phase Control Correction]

The following is a description of phase control and correction thereon.

FIGS. 12A-12D show an example of data TD3-TD6 for through up-regulation or through down-regulation.

The sets of data TD3-TD6 are data for thirteen times. The through up-regulation or through down-regulation is finished by repeating a half cycle of AC voltage V thirteen times. Instead of this, however, it is possible to perform the through up-regulation or through down-regulation by using suitable sets of data DT, e.g., data DT for twenty times or fifty times.

In FIG. 12A, the data TD3 shows an example of a ratio between OFF time and ON time of the heater 114 for each half cycle in the through up-regulation. As discussed earlier, in the through up-regulation, as the number of half cycles increases, a period of time during which the heater 114 is turned ON increases gradually. Note that no power is supplied to the heater 114 before the first half cycle, and, constant power is supplied to the heater 114 after the thirteenth half cycle.

In FIG. 12B, the data TD4 shows an example of a ratio between OFF time and ON time of the heater 114 for each half cycle in the through down-regulation. As discussed earlier, in the through down-regulation, as the number of half cycles increases, a period of time during which the heater 114 is turned ON decreases gradually. Note that constant power is supplied to the heater 114 before the first cycle, and no power is supplied to the heater 114 after the thirteenth half cycle.

In FIG. 12C, the data TD5 shows an example of the length of ON time and the length of OFF time of the heater 114 in the through up-regulation for frequency f of 50 Hz.

In FIG. 12D, the data TD6 shows an example of the length of ON time and the length of OFF time of the heater 114 in the through down-regulation for frequency f of 65 Hz.

As described earlier, when the frequency f or voltage value ve of AC voltage V varies, phase control is not performed as arranged. For example, it is assumed that, while the through up-regulation is performed in accordance with the data TD3, the voltage value ve drops drastically between the first half cycle and the second half cycle. In such a case, when the ratio of ON time of the heater 114 in the second half cycle remains 25% in accordance with the data TD3, the originally-expected power is not supplied to the heater 114. To cope with this, it is preferable to perform a correction process in such a manner that the ratio of ON time of the heater 114 increases appropriately depending on the voltage value ve of the AC voltage.

The correction value detection portion 111 stores, therein, a plurality sets of data, e.g., the data TD3-TD6, on frequency and voltage value that are used as the reference of the individual voltage values and frequencies. The correction value detection portion 111 calculates a correction value which enables the heater 114 to have preferable ON/OFF time in accordance with the detected voltage values and frequencies.

The following is a description of the case where the frequency f of AC voltage V varies and the voltage value ve thereof does not vary.

If the frequency increases compared to that of the original AC voltage V, then all of the "H" width, the "L" width, and the period reduce. In such a case, the use of the ratio between OFF time and ON time for the original AC voltage V reduces the amount of power supplied to the heater 114 per half cycle, compared to the case of the original AC voltage V. To cope with this, correction is so made that the length of OFF time reduces and the length of ON time increases.

If the frequency reduces compared to that of the original AC voltage V, then all of the "H" width, the "L" width, and the period increase. In such a case, the use of the ratio between OFF time and ON time for the original AC voltage V increases the amount of power supplied to the heater 114 per half cycle, compared to the case of the original AC voltage V. To cope with this, correction is so made that the length of OFF time increases and the length of ON time reduces.

The following is a description of the case where the frequency f of AC voltage V does not vary and the voltage value ve thereof varies.

If the voltage value ve increases compared to that of the original AC voltage V, then the "H" width increases, the "L" width reduces, and no change is seen in the period. In such a case, the use of the ratio between OFF time and ON time for the original AC voltage V increases the amount of power supplied to the heater 114 per half cycle, compared to the case of the original AC voltage V. To cope with this, correction is so made that the length of OFF time increases and the length of ON time reduces.

If the voltage value ve reduces compared to that of the original AC voltage V, then the "H" width reduces, the "L" width increases, and no change is seen in the period. In such a case, the use of the ratio between OFF time and ON time for the original AC voltage V reduces the amount of power supplied to the heater 114 per half cycle, compared to the case of the original AC voltage V. To cope with this, correction is so made that the length of OFF time reduces and the length of ON time increases.

For example, a description is provided below of a correction value for a case where the voltage value of the AC voltage V remains 100 V, and the frequency varies from 50 Hz to 47 Hz. As for the through down-regulation, if the frequency is 50 Hz, it is preferable that the OFF time is 3 milliseconds and the ON time is 7 milliseconds in the third half cycle. As for the through down-regulation, if the frequency is 47 Hz, it is preferable that the OFF time is 3.19 milliseconds and the ON time is 7.45 milliseconds in the third half cycle.

Up to the second half cycle, the phase control is performed based on data preferable for frequency of 50 Hz. Since the frequency is reduced to 47 Hz in the third half cycle, it is preferable to increase the OFF time.

The correction value is, for example, a value obtained by dividing the sum of the OFF time and ON time for frequency of 47 Hz by the sum of the OFF time and ON time for frequency of 50 Hz. To be specific, the correction value in this case is 1.064 (=10.64 milliseconds/10 milliseconds).

The heater remote generation portion 112 calculates the OFF time to be informed to the switching portion 113 by multiplying the obtained correction value by the OFF time (3.19 milliseconds) preferable for frequency of 47 Hz.

To be specific, the preferable OFF time is 3.39 milliseconds (=3.19 milliseconds X 1.064). The heater remote generation portion 112 generates a heater remote signal Sh based on the value.

[Descriptions with Reference to Flowcharts]

Power control by the power control portion 100 is described below with reference to flowcharts.

FIG. 13 is a flowchart depicting an example of the outline of power control performed by the power control portion 100.

Referring to FIG. 13, when the image forming apparatus 1 is turned ON (Step #11), a zero-crossing signal Sz is generated (Step #12), and the initial repeated pattern Pr is generated based on the zero-crossing signal Sz (Step #13). An operator enters a reference voltage value ver and a reference frequency fr, for example, so that the reference voltage value ver and the reference frequency fr are obtained (Step #14).

After the initial processing is finished, zero-crossing signal Sz is generated (Step #15). Then, a true "L" width and a true "H" width with influence of noise removed, specifically, true edges of a Low signal, a High signal, or the like are detected (Step #16). A voltage value ve and a frequency f are determined based on the true "L" width and the true "H" width (Step #17). Phase control is performed based on a phase angle corrected in accordance with the determined voltage value ve and frequency f (Step #18).

Further, the repeated pattern Pr is updated based on the true "L" width and the true "H" width (Step #19).

Descriptions are provided below with reference to the detailed flowcharts.

Figure 15:
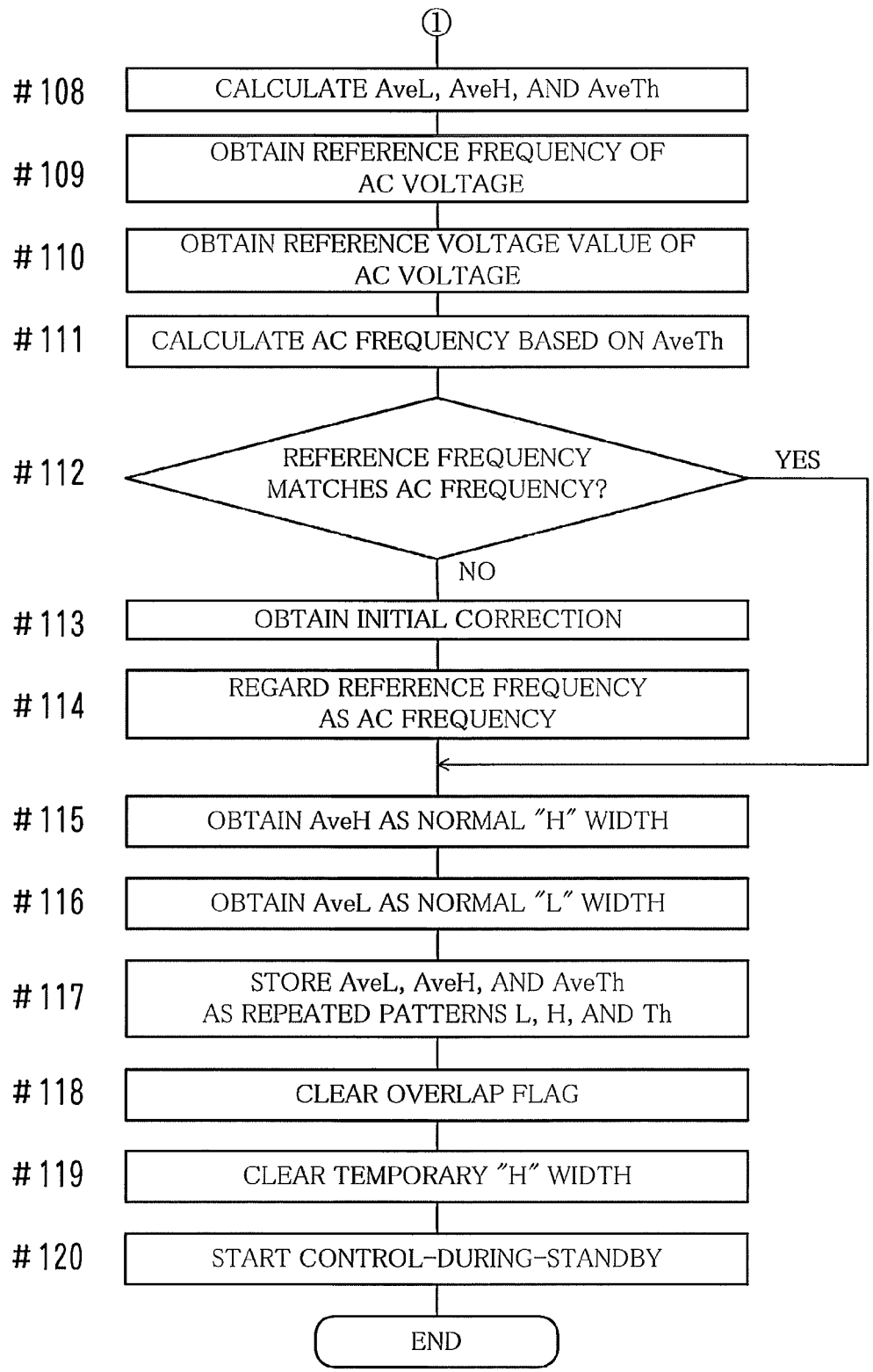

FIGS. 14 and 15 are flowcharts depicting an example of operation for a case where the image forming apparatus 1 is turned ON.

When the image forming apparatus 1 is turned ON, a zero-crossing signal Sz is generated based on AC voltage V. If the falling edge is detected from the generated zero-crossing signal Sz (Yes in Step #101), then detection of a time width is started (Step #102).

If the rising edge of the zero-crossing signal Sz is detected (Yes in Step #103), then a time width between the falling edge of the zero-crossing signal Sz and the rising edge thereof, i.e., an "L" width, is detected and stored (Step #104).

If the falling edge of the zero-crossing signal Sz is detected (Yes in Step #105), then a time width between the rising edge of the zero-crossing signal Sz and the falling edge thereof, i.e., an "H" width, is detected and stored (Step #106).

If each of the "L" width and the true "H" width is detected five times or more (Yes in Step #107), then an average AveL of the five "L" widths and an average AveH of the five "H" widths are calculated. The five "L" widths and the five "H"

widths are added all together, and the resultant is divided by 5, so that an average AveTh of the period Th is calculated (Step #108).

The reference frequency fr and the reference voltage value ver of the AC voltage V entered by the operator are obtained (Steps #109 and #110). The reference frequency fr and the reference voltage value ver are regarded as the frequency and the voltage value of the AC voltage in the site where the image forming apparatus 1 is installed. In practical, the frequency and the voltage value of the AC voltage V are not fixed to these values and sometimes vary.

Based on the average AveTh, the frequency of the AC voltage V, i.e., an AC frequency (frequency f) is calculated (Step #111).

A comparison is made between the reference frequency fr and the AC frequency (Step #112). If there is no match therebetween (No in Step #112), then initial correction (initial correction value) is calculated and obtained (Step #113), and the reference frequency fr is regarded as the AC frequency (Step #114).

The initial correction thus obtained is reflected in a set value of the OFF timer for phase control. The initial correction is calculated by dividing time corresponding to a half cycle of the reference frequency fr by time corresponding to a half cycle of the frequency calculated based on the average AveTh. For example, when the reference frequency is 50 Hz, the time corresponding to a half cycle is 10 milliseconds. When the frequency calculated based on the average AveTh is 55 Hz, the time corresponding to a half cycle is 9.09 milliseconds. At this time, the initial correction is 10 milliseconds/9.09 milliseconds. The initial correction is preferably added to the set value of the OFF timer for phase control.

If the reference frequency fr matches the AC frequency (Yes in Step #112), then the processing in Steps #113 and #114 are not performed.

The average AveH is obtained as a normal "H" width (Step #115), and the average AveL is obtained as a normal "L" width (Step #116).

The average AveL is stored as the width of a Low signal L for the repeated pattern Pr (hereinafter, referred to as a repeated pattern "L" width) (Step #117). The average AveH is stored as the width of a High signal H for the repeated pattern Pr (hereinafter, referred to as a repeated pattern "H" width) (Step #117). The average AveTh is stored as the period for the repeated pattern Pr (hereinafter, referred to as the repeated pattern Th)(Step #117).

An overlap flag used in control-during-standby and in supervisory control on overlap of zero-crossing signal is cleared (Step #118), and the temporary "H" width is cleared (Step #119). The control-during-standby is started (Step #120).

Figure 16:
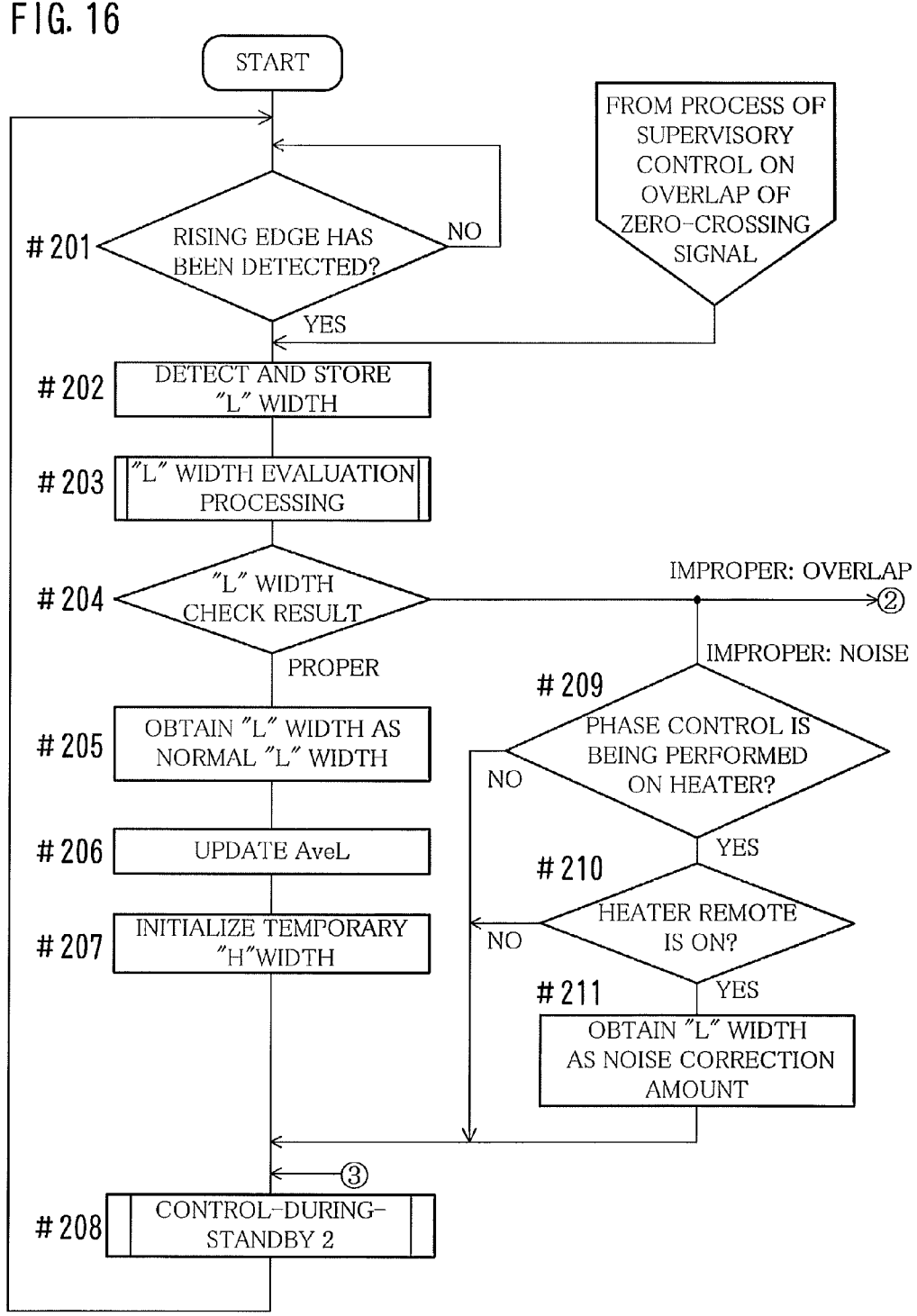
FIG. 16 is a first flowchart depicting an example of first operation of control-during-standby.
Figure 17:
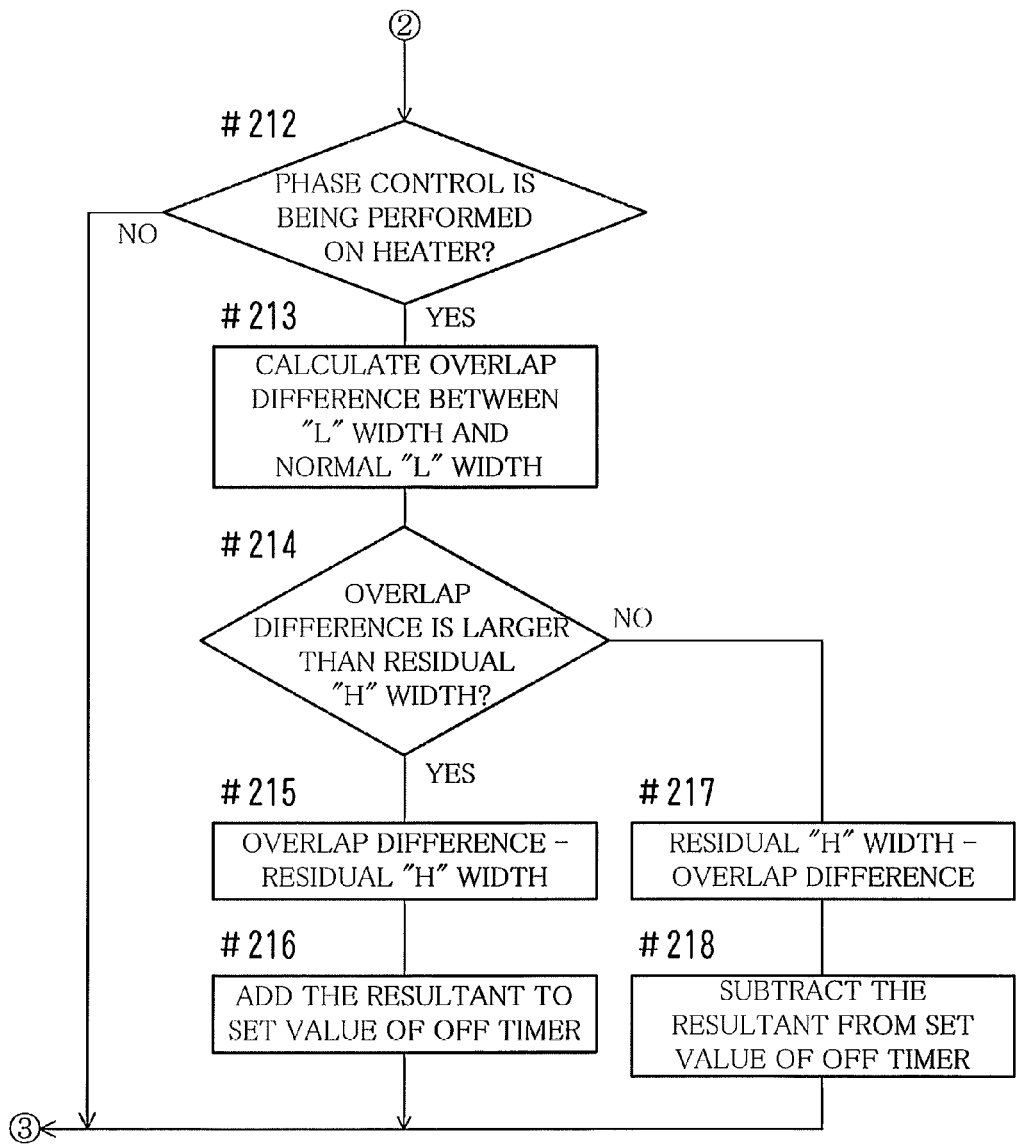
FIG. 17 is a second flowchart depicting an example of first operation of control-during-standby.

FIGS. 16 and 17 are flowcharts depicting an example of first operation of control-during-standby on the image forming apparatus 1.

First, if the rising edge of a zero-crossing signal Sz is detected (Yes in Step #201), then an "L" width is detected and stored (Step #202). The "L" width evaluation processing is performed on the "L" width (Step #203).

If the "L" width is determined to be proper (true) through the "L" width evaluation processing (PROPER in Step #204), then the "L" width detected this time is obtained as a normal "L" width (Step #205).

An average of the current average AveL and the normal "L" width is calculated and the resultant value is updated with the current average AveL (Step #206).

The temporary "H" width is initialized for detection of an "H" width (Step #207), and the second operation for control-during-standby is performed (Step #208).

If the "L" width is determined to be improper (noise) through the "L" width evaluation processing (IMPROPER: noise in Step #204), then it is checked whether or not the phase control on the heater is being performed (Step #209). If the phase control is not being performed on the heater (No in Step #209), then the second operation for control-during-standby is performed (Step #208). If the phase control is being performed on the heater (Yes in Step #209), then it is checked whether or not the heater remote signal Sh is turned ON (Step #210).

If the heater remote signal Sh is not turned ON (No in Step #210), then the second operation for control-during-standby is performed (Step #208). If the heater remote signal Sh is turned ON (Yes in Step #210), then the "L" width is obtained as a noise correction amount (Step #211), and the second operation for control-during-standby is performed (Step #208).

The "L" width determined to be noise is subtracted, as a noise correction amount, from a set value of the OFF timer in the next half cycle. Stated differently, in the current half cycle, the appearance of noise reduces the power to be supplied to the heater 114 by an amount corresponding to the "L" width due to the noise. In view of this, in the subsequent half cycle, a larger amount of power is supplied to the heater 114 correspondingly. The noise correction amount is subtracted from the set value of the OFF timer in the next half cycle, which increases time to supply power to the heater 114.

If the "L" width is determined to be improper (an overlap) through the "L" width evaluation processing (IMPROPER: overlap in Step #204), then it is checked whether or not the phase control on the heater is being performed (Step #212). If the phase control is not being performed on the heater (No in Step #212), then the second operation for control-during-standby is performed (Step #208). If the phase control is being performed on the heater (Yes in Step #212), then an overlap difference is calculated by subtracting the normal "L" width from the "L" width detected this time (Step #213), and a residual "H" width is compared with the overlap difference (Step #214).

If the overlap difference is larger than the residual "H" width (Yes in Step #214), then the residual "H" width is subtracted from the overlap difference (Step #215), the resultant value is added to the set value of the OFF timer (Step #216), and the second operation for control-during-standby is performed (Step #208).

If the overlap difference is equal to or smaller than the residual "H" width (No in Step #214), then the overlap difference is subtracted from the residual "H" width (Step #217), the resultant value is subtracted from the set value of the OFF timer (Step #218), and the second operation for control-during-standby is performed (Step #208).

When the "L" width is determined to be improper (an overlap), the heater remote signal Sh is turned OFF after the residual "H" width time has elapsed since the falling edge of the zero-crossing signal Sz. If the overlap difference is larger than the residual "H" width, then the set value of the OFF timer is increased to suppress the increase in amount of power supply. If the overlap difference is equal to or smaller than the residual "H" width, then the set value of the OFF timer is reduced to suppress the reduction in amount of power supply.

The second operation for control-during-standby is described. The second operation for control-during-standby is performed in Step #208 of FIG. 16.

Figure 18:
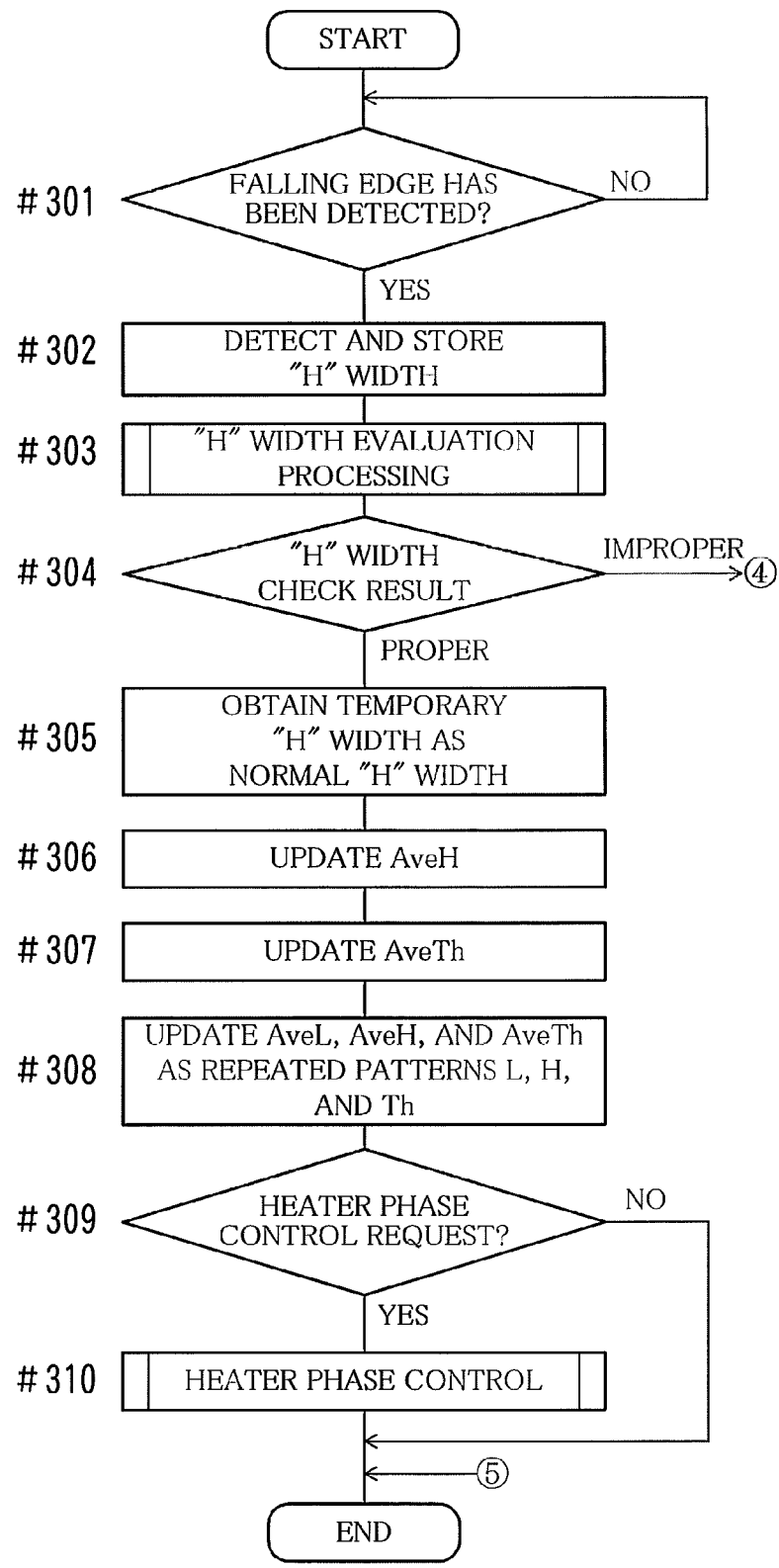
FIG. 18 is a first flowchart depicting an example of second operation of control-during-standby.

FIG. 18 is a flowchart depicting an example of second operation for control-during-standby.

If the falling edge of the zero-crossing signal Sz is detected (Yes in Step #301), then an "H" width is detected (Step #302).

The "H" width evaluation processing is performed (Step #303).

If the "H" width is determined to be proper through the "H" width evaluation processing (PROPER in Step #304), then the current temporary "H" width is obtained as a normal "H" width (Step #305).

An average of the current average AveH and the normal "H" width is calculated and the resultant value is updated with the current average AveH (Step #306). The current average AveL and the current average AveH are added together, and the resultant value is updated with the current average AveTh (Step #307).

The average AveL is updated as the repeated pattern "L" width, the average AveH is updated as the repeated pattern "H" width, and the average AveTh is updated as the repeated pattern Th (Step #308). In this way, the repeated pattern "L" width, the repeated pattern "H" width, and the repeated pattern Th are updated.

A check is made as to whether or not phase control on the heater is requested (Step #309). If no request for phase control on the heater is made (No in Step #309), then the second operation for control-during-standby is finished and the processing in Step #201 of FIG. 16 is performed.

If a request for phase control on the heater is made (Yes in Step #309), then the phase control on the heater is performed (Step #310), the second operation for control-during-standby is finished, and the processing in Step #201 of FIG. 16 is performed.

If the "H width is determined to be improper through the "H" width evaluation processing (IMPROPER in Step #304), then it is checked whether or not phase control on the heater is being performed (Step #311).

If the phase control on the heater is not being performed (No in Step #311), then the second operation for control-during-standby is finished and the processing in Step #201 of FIG. 16 is performed.

If the phase control on the heater is being performed (Yes in Step #311), then the residual "H" width is calculated (Step #312). The residual "H" width is calculated by subtracting a temporary Th calculated in Step #502 described later from the repeated pattern Th.

If the residual "H" width is larger than the normal "L" width (No in Step #313), then the second operation for control-during-standby is finished and the processing in Step #201 of FIG. 16 is performed.

If the residual "H" width is equal to or smaller than the normal "L" width (Yes in Step #313), then supervisory control on overlap of the zero-crossing signal Sz is performed (Step #314). The second operation for control-during-standby is then finished and the processing in Step #201 of FIG. 16 is performed.

The phase control on the heater is performed (Step #310), the second operation for control-during-standby is finished, and the processing in Step #201 of FIG. 16 is performed.

The "L" width evaluation processing is described. The "L" width evaluation processing is performed in Step #203 of FIG. 16.

Figure 20:
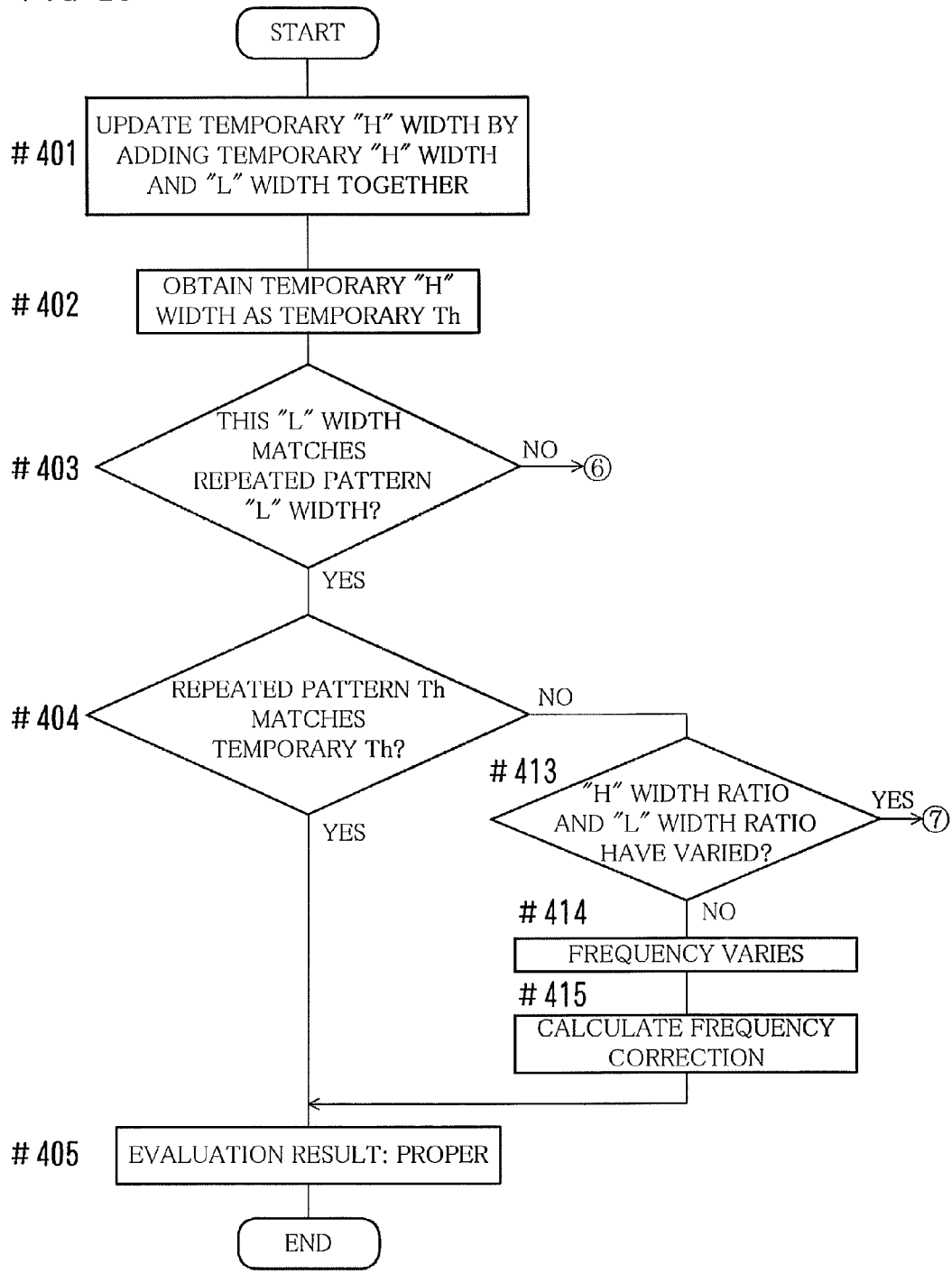
FIG. 20 is a first flowchart depicting an example of operation for "L" width evaluation processing.
Figure 21:
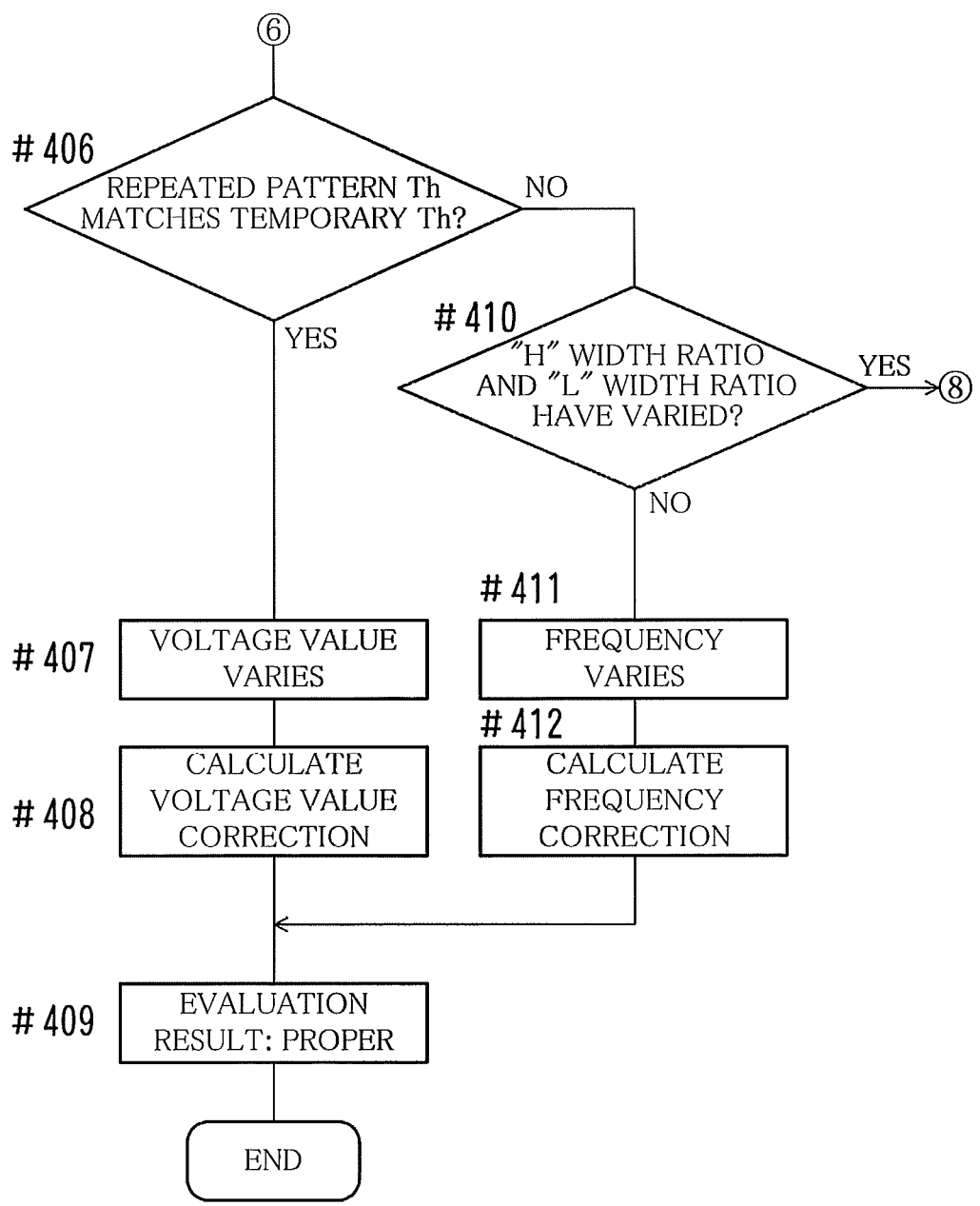
FIG. 21 is a second flowchart depicting an example of operation for "L" width evaluation processing.
Figure 22:
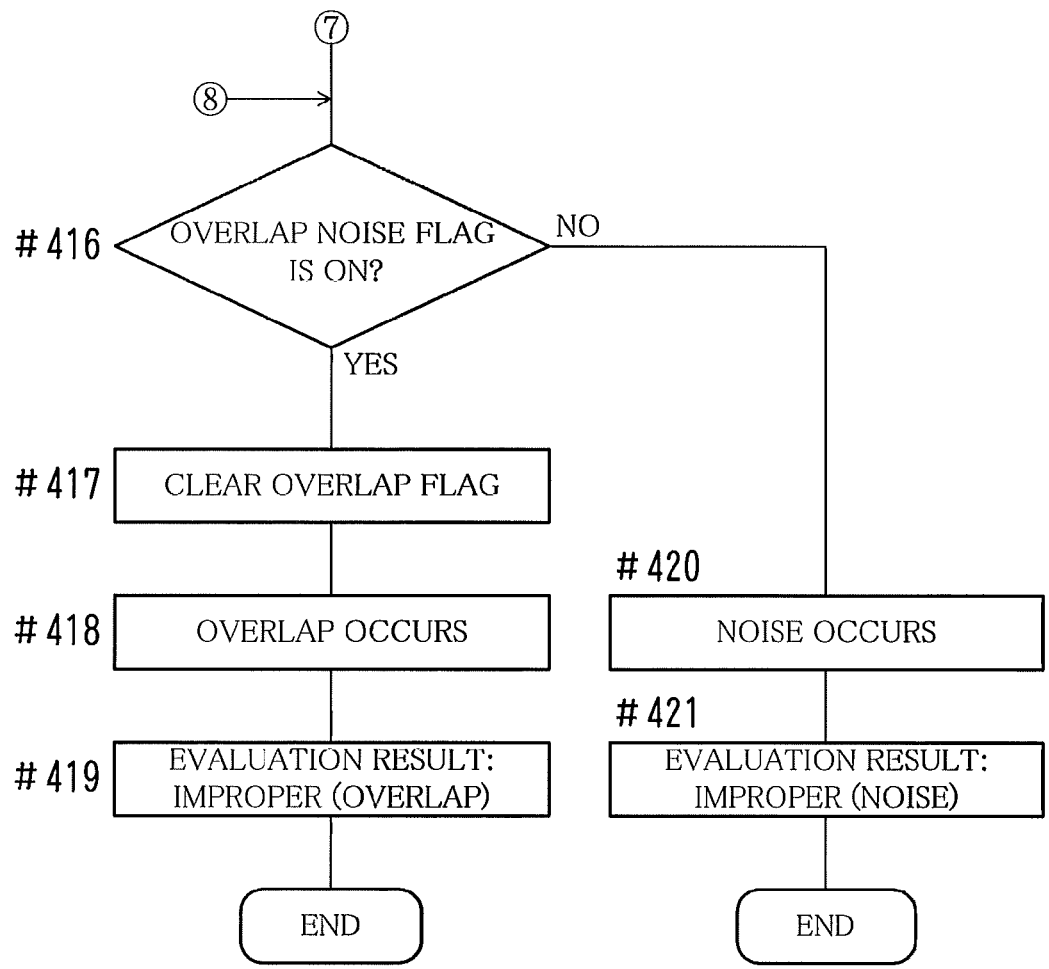
FIG. 22 is a third flowchart depicting an example of operation for "L" width evaluation processing.

FIGS. 20-22 are flowcharts depicting an example of the "L" width evaluation processing performed by the image forming apparatus 1.

A value obtained by adding the current temporary "H" width and an "L" width together is updated as a new temporary "H" width (Step #401). The new temporary "H" width is obtained as a temporary Th (Step #402). This "L" width is compared with the repeated pattern "L" width (Step #403).

If this "L" width matches the repeated pattern "L" width (Yes in #403), then the repeated pattern Th is compared with the temporary Th (Step #404).

If the repeated pattern Th matches the temporary Th (Yes in Step #404), then it is determined that this "L" width is proper (Step #405).

If the repeated pattern Th does not match the temporary Th (No in Step #404), then it is checked whether or not the "H" width ratio and the "L" width ratio have varied (Step #413).

To be specific, it is checked whether or not each of ((temporary Th–this "L" width)/temporary Th) and (this "L" width/temporary Th) has varied compared to (AveH/AveTh) and (AveL/AveTh). If the check result is positive, then it means that the "H" width ratio and the "L" width ratio have varied.

If neither "H" width ratio nor "L" width ratio has varied (No in Step #413), then it is determined that the frequency of AC voltage V has varied (Step #414), and frequency correction is obtained (Step #415). The frequency correction is represented, for example, by the expression of (temporary Th/repeated pattern Th).

Then, it is determined that this "L" width is proper (Step #405).

If this "L" width does not match the repeated pattern "L" width (No in #403), then the repeated pattern Th is compared with the temporary Th (Step #406).

If the repeated pattern Th matches the temporary Th (Yes in Step #406), then it is determined that the frequency of the AC voltage V has not varied and the voltage value has varied (Step #407), and voltage value correction is calculated (Step #408). For example, if the voltage rises, and the variation ratio is 8%, then the voltage value correction is 1.08. If the voltage drops, and the variation ratio is 10%, then the voltage value correction is 0.9.

Then, it is determined that this "L" width is proper (Step #409).

If the repeated pattern Th does not match the temporary Th (No in Step #406), then it is checked whether or not the "H" width ratio and the "L" width ratio have varied (Step #410).

To be specific, it is checked whether or not each of ((temporary Th–this "L" width)/temporary Th) and (this "L" width/temporary Th) has varied compared to (AveH/AveTh) and (AveL/AveTh). If the check result is positive, then it means that the "H" width ratio and the "L" width ratio have varied.

If neither "H" width ratio nor "L" width ratio has varied (No in Step #410), then it is determined that the frequency of AC voltage V has varied (Step #411), and frequency correction is calculated (Step #412). The frequency correction is represented, for example, by the expression of (temporary Th/repeated pattern Th).

Then, it is determined that this "L" width is proper (Step #409).

If it is found that the "H" width ratio and the "L" width ratio have varied (Yes in Step #413), then it is determined whether or not an overlap noise flag is turned ON (Step #416). Likewise, if it is found that the "H" width ratio and the "L" width ratio have varied (Yes in Step #410), then it is determined whether or not an overlap noise flag is turned ON (Step #416). If it is determined that the overlap noise flag is turned ON (Yes in Step #416), then the overlap noise flag is cleared (Step #417), and it is determined that an overlap occurs (Step #418). Then, it is determined that this "L" width is improper and an overlap occurs (Step #419).

If it is determined that the overlap noise flag is not turned ON (No in Step #416), then it is determined that noise occurs (Step #420), and that this "L" width is improper (Step #421).

The "H" width evaluation processing is described. The "H" width evaluation processing is performed in Step #303 of FIG. 18.

Figure 23:
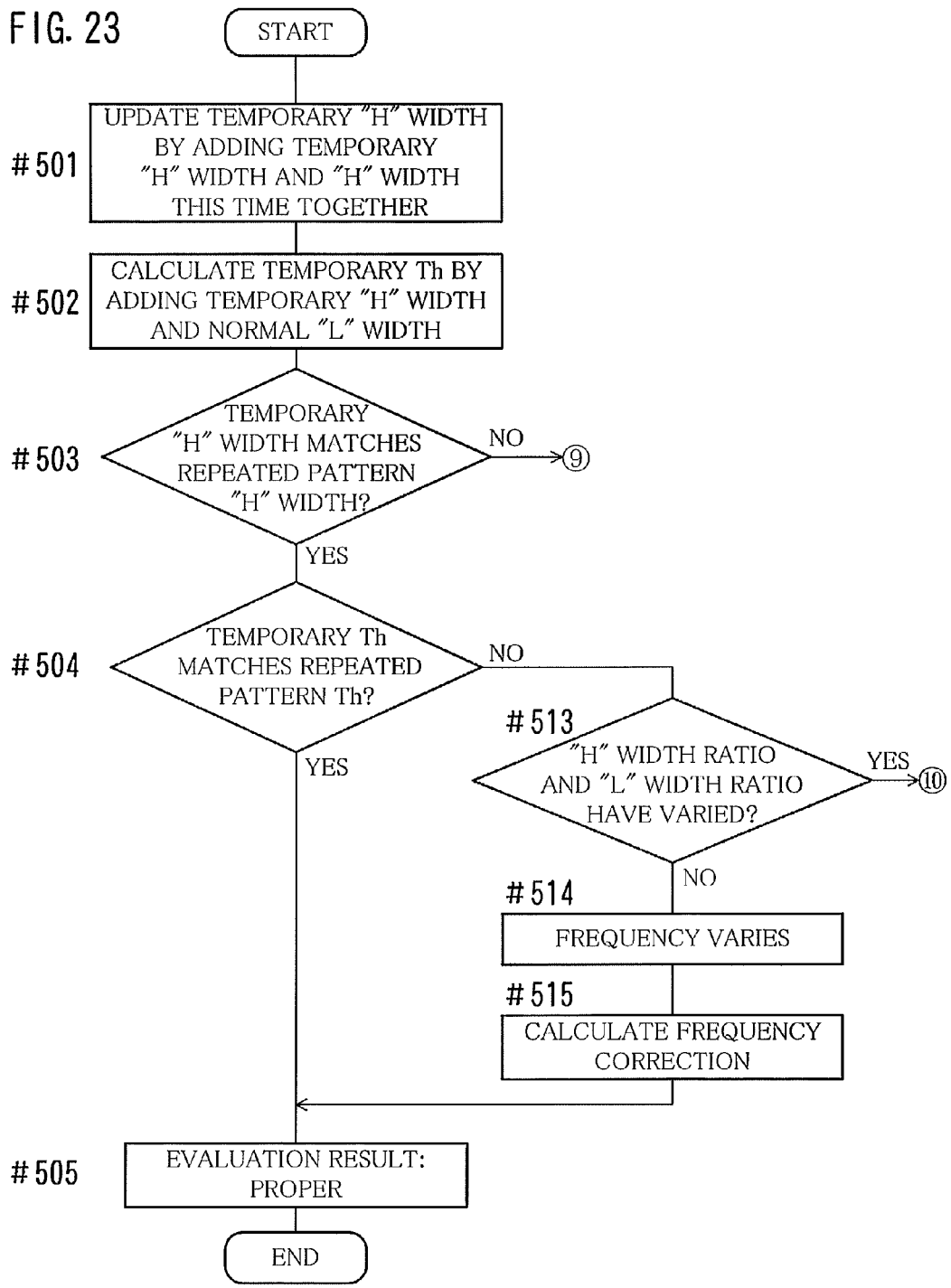
FIG. 23 is a first flowchart depicting an example of operation for "H" width evaluation processing performed by an image forming apparatus.
Figure 24:
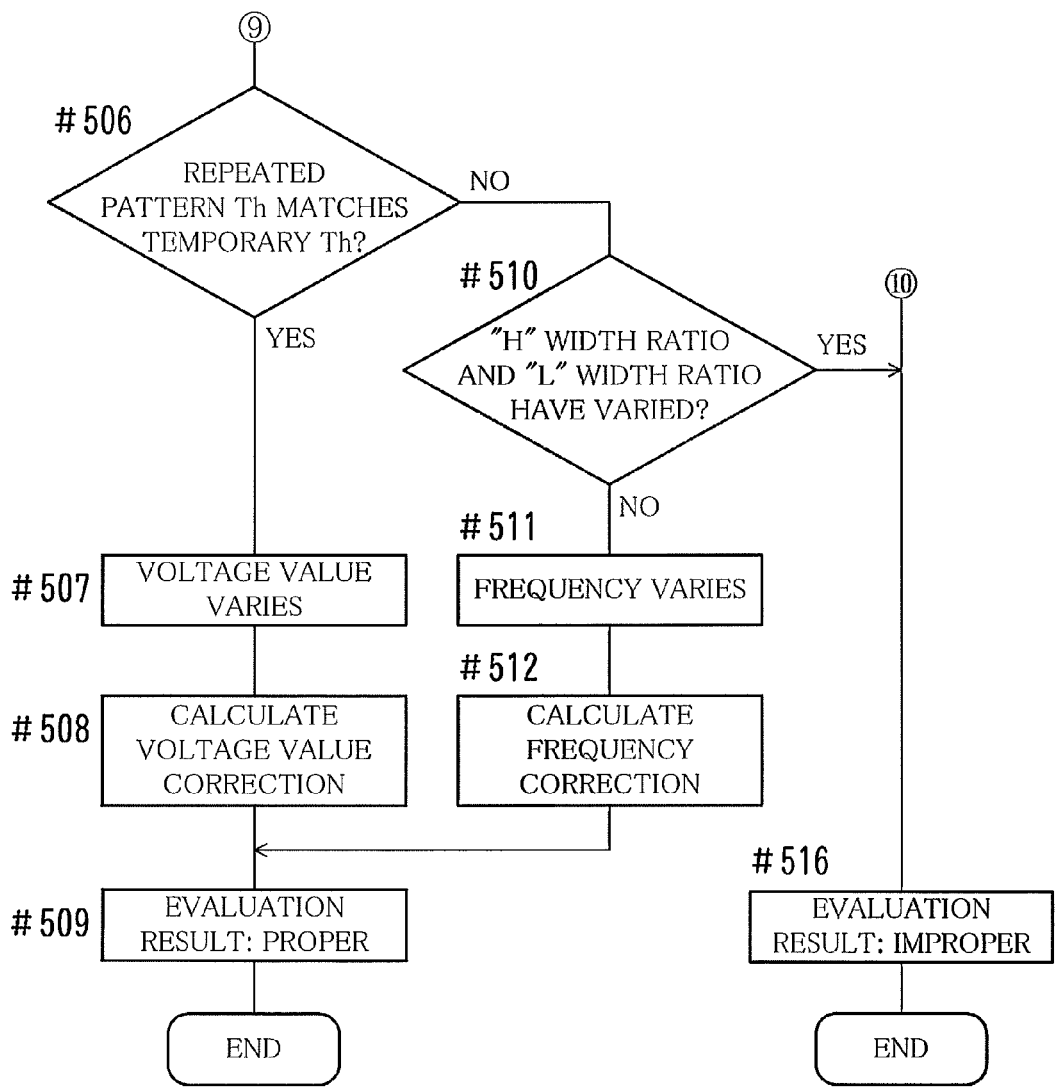
FIG. 24 is a second flowchart depicting an example of operation for "H" width evaluation processing performed by an image forming apparatus.

FIG. 23 is a flowchart depicting an example of the "H" width evaluation processing performed by the image forming apparatus 1.

A value obtained by adding the current temporary "H" width and an "H" width detected this time together is updated as a new temporary "H" width (Step #501). The new temporary "H" width is added to the normal "L" width, so that a temporary Th is calculated (Step #502).

The new temporary "H" width is compared with the repeated pattern "H" width (Step #503).

If the new temporary "H" width matches the repeated pattern "H" width (Yes in #503), then the temporary Th is compared with the repeated pattern Th (Step #504).

If the temporary Th matches the repeated pattern Th (Yes in Step #504), then it is determined that the falling edge of the "H" width detected this time is proper (Step #505).

If the temporary Th does not match the repeated pattern Th (No in Step #504), then it is checked whether or not the "H" width ratio and the "L" width ratio have varied (Step #513).

To be specific, it is checked whether or not each of ((temporary Th−normal "L" width)/temporary Th) and (this "L" width/temporary Th) has varied compared to (AveH/AveTh) and (AveL/AveTh). If the check result is positive, then it means that the "H" width ratio and the "L" width ratio have varied.

If neither "H" width ratio nor "L" width ratio has varied (No in Step #513), then it is determined that the frequency of AC voltage V has varied (Step #514), and frequency correction is obtained (Step #515). The frequency correction is represented, for example, by the expression of (temporary Th/repeated pattern Th).

Then, it is determined that the falling edge of this "H" width is proper (Step #505).

If the new temporary "H" width does not match the repeated pattern "H" width (No in #503), then the repeated pattern Th is compared with the temporary Th (Step #506).

If the repeated pattern Th matches the temporary Th (Yes in Step #506), then it is determined that the frequency of the AC voltage V has not varied and the voltage value has varied (Step #507), and voltage value correction is calculated (Step #508). For example, if the voltage rises, and the variation ratio is 8%, then the voltage value correction is 1.08. If the voltage drops, and the variation ratio is 10%, then the voltage value correction is 0.9. It is then determined that the falling edge of this "H" width is proper (Step #509).

If the repeated pattern Th does not match the temporary Th (No in Step #506), then it is checked whether or not the "H" width ratio and the "L" width ratio have varied (Step #510).

To be specific, it is checked whether or not each of ((temporary Th−normal "L" width)/temporary Th) and (normal "L" width/temporary Th) has varied compared to (AveH/AveTh) and (AveL/AveTh). If the check result is positive, then it means that the "H" width ratio and the "L" width ratio have varied.

If neither "H" width ratio nor "L" width ratio has varied (No in Step #510), then it is determined that the frequency of AC voltage V has varied (Step #511), and frequency correction is calculated (Step #512). The frequency correction is represented, for example, by the expression of (temporary Th/repeated pattern Th).

It is then determined that the falling edge of this "H" width is proper (Step #509).

If it is found that the "H" width ratio and the "L" width ratio have varied (Yes in Step #513), then it is determined that the falling edge of this "H" width is noise and improper (Step #516). Likewise, if it is found that the "H" width ratio and the "L" width ratio have varied (Yes in Step #510), then it is determined that the falling edge of this "H" width is noise and improper (Step #516).

Operation for phase control on the heater 114 is described below. The operation for phase control on the heater 114 is performed in Step #310 of FIG. 18 and Step #806 of FIG. 27.

Figure 25:
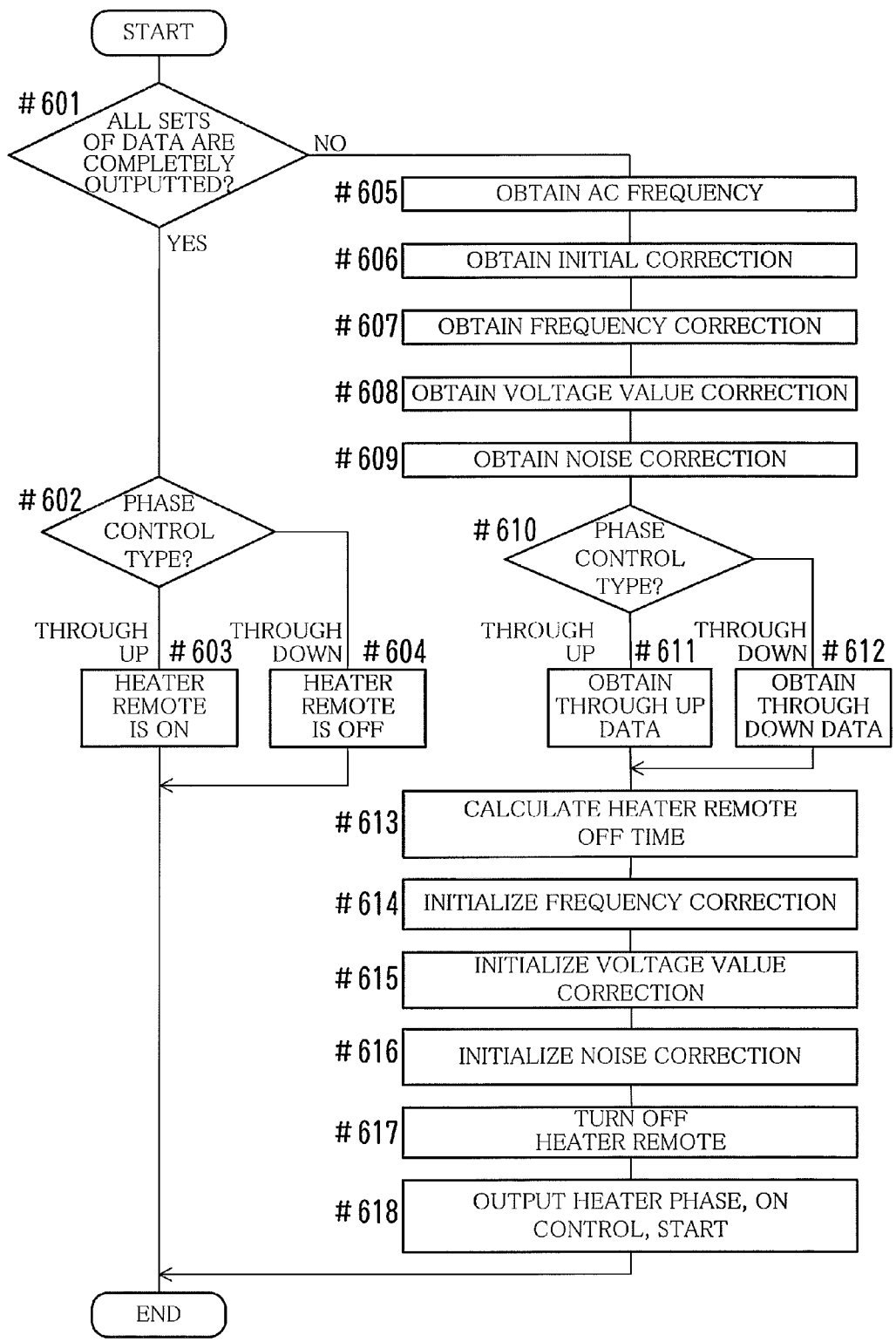
FIG. 25 is a flowchart depicting an example of operation for phase control on a heater.

FIG. 25 is a flowchart depicting an example of operation for phase control on the heater 114 of an image forming apparatus. The operation corresponds to the operation of Step #310 of FIG. 18.

The phase control is performed when supplying power to the heater 114 is started or supplying power thereto is stopped. The phase control synchronizes with a proper falling edge of a zero-crossing signal Sz.

The phase control is performed in accordance with data indicating the ratio between OFF time and ON time of the heater 114 for each half cycle of AC voltage V in the phase control.

When the phase control is performed based on such data, and the phase control is finished with all sets of data used (Yes in Step #601), the type of the phase control is checked (Step #602).

When it is found that the phase control is through up-regulation, a heater remote signal Sh is turned ON (Step #603), and the heater 114 is supplied with all power.

When it is found that the phase control is through down-regulation, the heater remote signal Sh is turned OFF (Step #604), and the heater 114 is supplied with no power.

If data for the phase control has not yet been outputted completely and the phase control has not yet been finished completely (No in Step #601), then the current AC frequency is obtained (Step #605).

Further, initial correction is obtained (Step #606), frequency correction is obtained (Step #607), voltage value correction is obtained (Step #608), and noise correction is obtained (Step #609). These sets of correction data are used to correct a set value of the OFF timer.

The sets of correction data are initial correction for the case where the image forming apparatus 1 is turned ON, frequency correction for the case where the frequency of AC voltage V has varied, voltage value correction for the case where the voltage value of AC voltage V has varied, and noise correction for the case where power supply to the heater 114 is stopped due to noise occurring in a zero-crossing signal with the heater remote signal Sh turned ON.

The type of the phase control is checked (Step #602).

When it is found that the phase control is through up-regulation, data for through up-regulation is obtained (Step #611). When it is found that the phase control is through down-regulation, data for through down-regulation is obtained (Step #612).

Heater remote OFF time (set value of the OFF timer) that is time required for the heater 114 to be turned ON is calculated (Step #613).

The set value of the OFF timer is calculated, for example, by the following expression:

((Time corresponding to half waveform of AC frequency)×(heater OFF ratio)×(initial correction)×(frequency correction)×(voltage correction))−(noise correction)

The frequency correction is initialized (Step #614), the voltage value correction is initialized (Step #615), and the noise correction is initialized (Step #616).

The heater remote signal Sh is turned OFF (Step #617), and after the lapse of the calculated time, the heater remote signal Sh is turned ON, and the phase control is performed on the heater 114.

Figure 26:
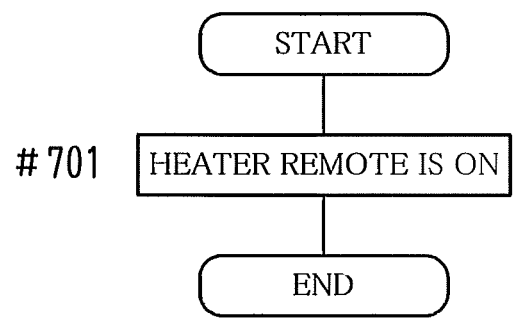
FIG. 26 is a flowchart depicting an example of operation for ON control on a heater.

FIG. 26 shows an example of operation for ON control on the heater 114 of the image forming apparatus 1. The operation starts in response to the process of Step #618 of FIG. 25.

After the lapse of time corresponding to the calculated set value of the OFF timer since the operation started, output of the heater 114 is turned ON (Step #701).

Descriptions are given below of operation for supervisory control on overlap of a zero-crossing signal Sz. The operation for supervisory control on overlap of the zero-crossing signal Sz is performed in Step #314 of FIG. 19.

Figure 27:
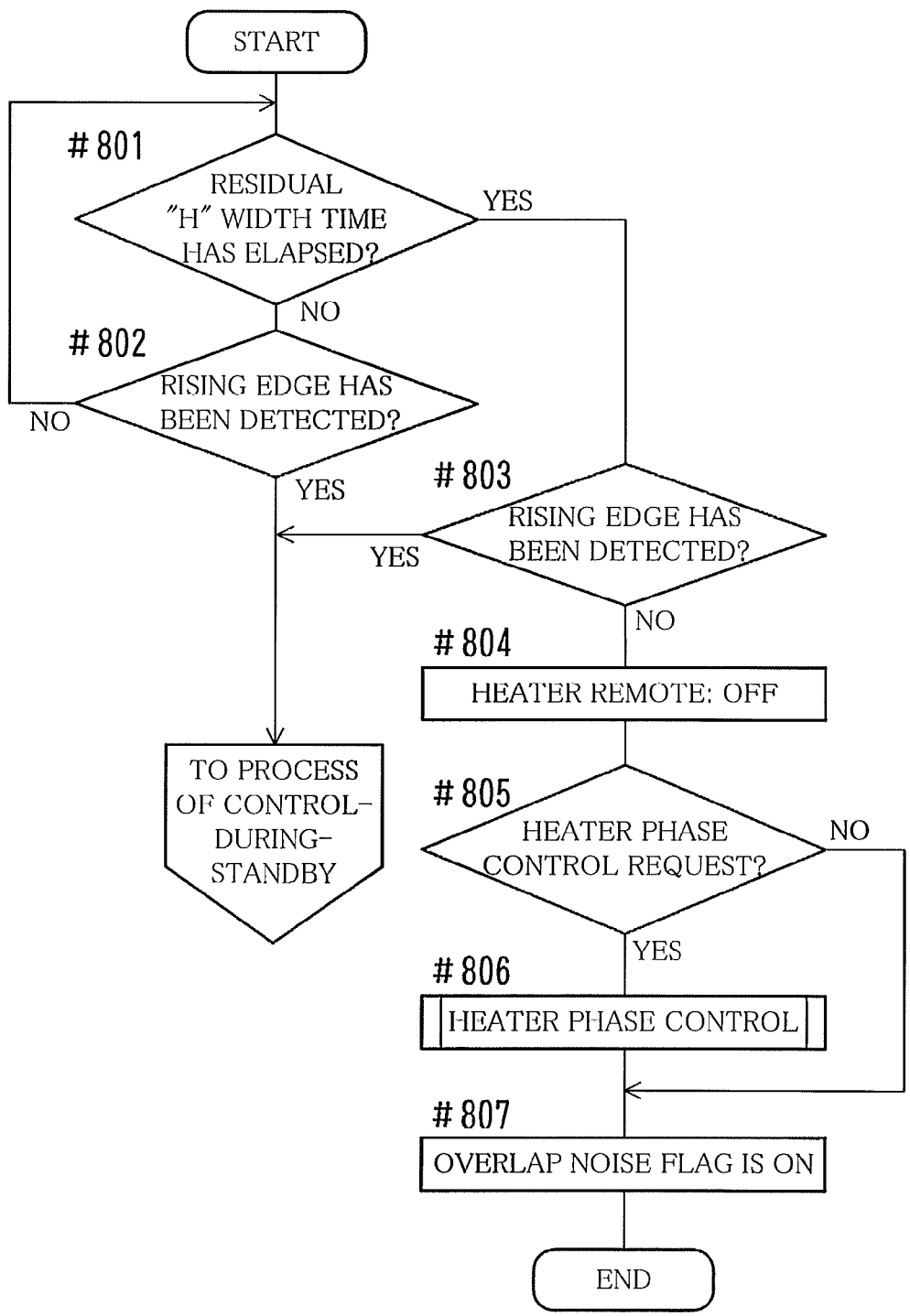
FIG. 27 is a flowchart depicting an example of operation for supervisory control on overlap of a zero-crossing signal.

FIG. 27 is a flowchart depicting an example of operation for supervisory control on overlap of the zero-crossing signal Sz by the image forming apparatus 1.

Figure 19:
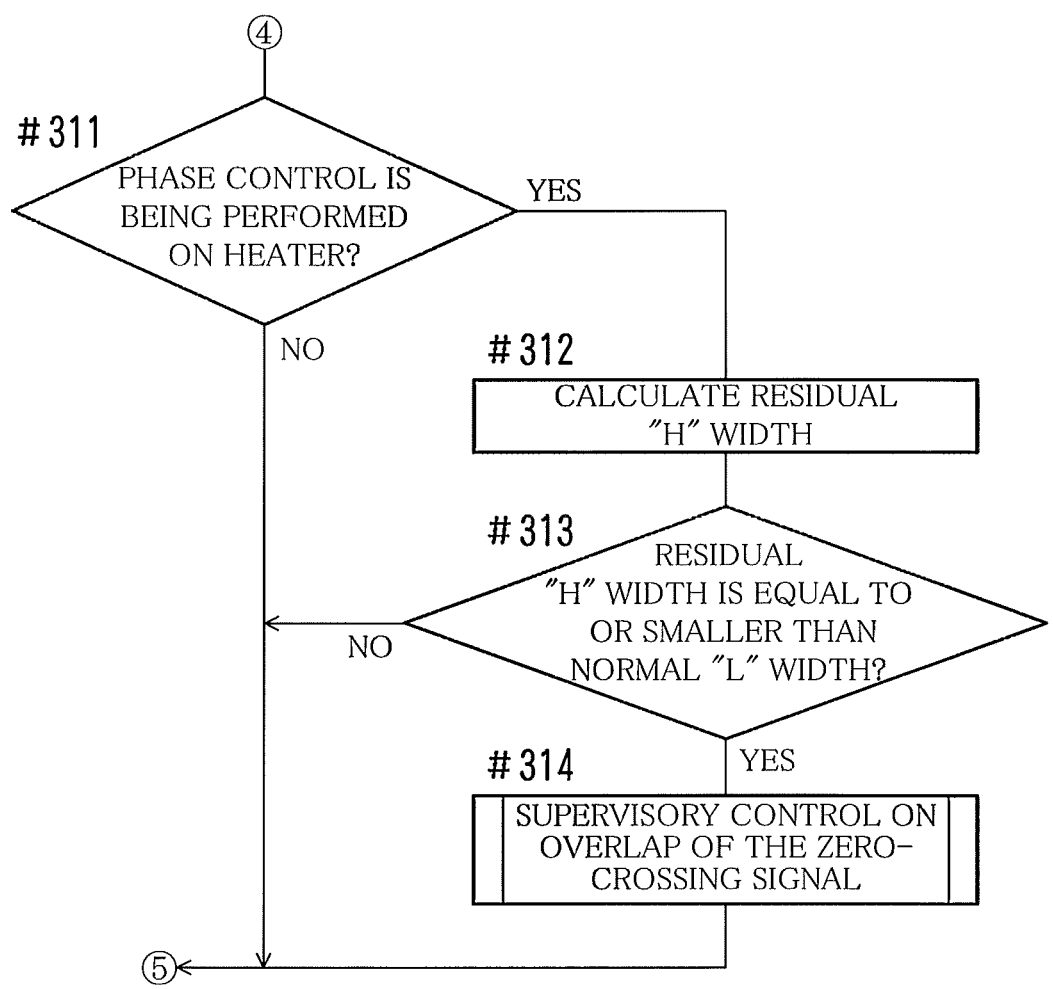
FIG. 19 is a second flowchart depicting an example of second operation of control-during-standby.

It is checked whether or not time corresponding to the residual "H" width calculated in Step #312 of FIG. 19 has elapsed (Step #801).

If the time corresponding to the residual "H" width has not yet elapsed (No in Step #801), and if no rising edge is detected (No in Step #802), then the process goes back to Step #801. If the time corresponding to the residual "H" width has not yet elapsed (No in Step #801), and if a rising edge is detected (Yes in Step #802), then the process goes to Step #202 of FIG. 16.

If the time corresponding to the residual "H" width has already elapsed (Yes in Step #801), and if a rising edge is detected (Yes in Step #803), then the process goes to Step #202 of FIG. 16.

If the time corresponding to the residual "H" width has already elapsed (Yes in Step #801), and if no rising edge is detected (No in Step #803), then the heater remote signal Sh is turned OFF (Step #804).

If phase control on the heater 114 is requested (Yes in Step #805), then the phase control on the heater 114 is performed (Step #806), and an overlap noise flag is turned ON (Step #807).

If phase control on the heater 114 is not requested (No in Step #805), then the overlap noise flag is turned ON (Step #807).

As discussed above, the image forming apparatus 1 according to this embodiment is configured to perform a preferable phase control by correcting the set value of the OFF timer even if a frequency or a voltage value of AC voltage V varies during the phase control.

The image forming apparatus 1 is also configured to perform a preferable phase control without being affected by noise in the zero-crossing signal Sz caused by noise in AC voltage V.

In the embodiment discussed above, the overall configurations of the power control portion 100, the image forming apparatus 1, the configurations of various portions thereof, the shape, the size, the number, the material, the content, order and timing of the processing, and the like may be altered as required in accordance with the subject matter of the present invention.

While example embodiments of the present invention have been shown and described, it will be understood that the present invention is not limited thereto, and that various changes and modifications may be made by those skilled in the art without departing from the scope of the invention as set forth in the appended claims and their equivalents.

What is claimed is:

1. A power control method for performing phase control by using AC power supplied from an AC power supply, the method comprising:
generating a zero-crossing signal that indicates a first level if an absolute value of AC voltage from the AC power supply is equal to or smaller than a predetermined value, and indicates a second level if the absolute value of the AC voltage is larger than the predetermined value;
detecting a zero-crossing width and a non-zero-crossing width of the zero-crossing signal, the zero-crossing width being a time width of the zero-crossing signal for a case where the absolute value of the AC voltage is equal to or smaller than the predetermined value, the non-zero-crossing width being a time width of the zero-crossing signal for a case where the absolute value of the AC voltage is equal to or larger than the predetermined value;
detecting a frequency and a voltage value of the AC voltage based on the zero-crossing width detected and the non-zero-crossing width detected; and
performing phase control depending on the frequency detected and the voltage value detected.

2. The power control method according to claim 1, comprising
detecting the zero-crossing width where no influence of noise is present and the non-zero-crossing width where no influence of noise is present by using a reference zero-crossing width that is used as a reference of zero-crossing width, a reference non-zero-crossing width that is used as a reference of non-zero-crossing width, the zero-crossing width detected, and the non-zero-crossing width detected, the reference zero-crossing width and the reference non-zero-crossing width being generated based on the zero-crossing width and the non-zero-crossing width in the AC voltage where no noise occurs,
detecting the frequency and the voltage value based on the zero-crossing width where no influence of noise is present and the non-zero-crossing width where no influence of noise is present, and
performing the phase control depending on the frequency detected and the voltage value detected.

3. The power control method according to claim 1, wherein the first level is an L level and the second level is an H level, and
as the non-zero-crossing width, a width between a rising edge and a falling edge of the zero-crossing signal is detected, and, as the zero-crossing width, a width between a falling edge and a rising edge of the zero-crossing signal is detected.

4. The power control method according to claim 1, wherein through up-regulation is performed as the phase control, the through up-regulation being for gradually increasing a conduction angle to a load by setting a start position of the zero-crossing width at a position where a phase angle φ is zero and by changing a range of the phase angle φ corresponding to ON between π and 0 for each half cycle of the AC voltage.

5. The power control method according to claim 1, wherein through down-regulation is performed as the phase control, the through down-regulation being for gradually reducing a conduction angle to a load by setting a start position of the zero-crossing width at a position where a phase angle φ is zero and by changing a range of the phase angle φ corresponding to ON between 0 and π for each half cycle of the AC voltage.

6. The power control method according to claim 4, wherein the phase control is performed by changing the phase angle φ depending on the AC voltage detected.

7. The power control method according to claim 6, wherein, when the non-zero-crossing width detected reduces, the zero-crossing width detected increases, and the frequency of the AC voltage does not change, the conduction angle to the load is increased.

8. The power control method according to claim 6, wherein, when the non-zero-crossing width detected increases, the zero-crossing width detected reduces, and the frequency of the AC voltage does not change, the conduction angle to the load is reduced.

9. The power control method according to claim 1, wherein through up-regulation is performed as the phase control, the through up-regulation being for gradually increasing conduction time to a load for each half cycle of the AC voltage.

10. The power control method according to claim 1, wherein through down-regulation is performed as the phase control, the through down-regulation being for gradually reducing conduction time to a load for each half cycle of the AC voltage.

11. The power control method according to claim 9, wherein the phase control is performed by changing the conduction time depending on the detected frequency of the AC voltage.

12. The power control method according to claim 11, wherein, when the non-zero-crossing width detected reduces, the zero-crossing width detected reduces, and the frequency of the AC voltage increases, the conduction time to the load is increased.

13. The power control method according to claim 11, wherein, when the non-zero-crossing width detected increases, the zero-crossing width detected increases, and the frequency of the AC voltage reduces, the conduction time to the load is reduced.

14. The power control method according to claim 12, wherein, when noise occurs in the AC voltage, a conduction angle in a half cycle next to a half cycle of the AC voltage in which the noise occurs is corrected by an amount corresponding to a zero-crossing width due to the noise.

15. The power control method according to claim 1, comprising obtaining externally a reference frequency and a reference voltage, the reference frequency being frequency used as a reference of the AC voltage, the reference voltage being used as a reference of the AC voltage.

16. The power control method according to claim 15, comprising performing correction on phase control based on a difference between the reference frequency and the detected frequency of the AC voltage, and a difference between the reference voltage and the detected AC voltage.

17. A power control device for performing phase control by using AC power supplied from an AC power supply, the device comprising:
a zero-crossing signal generation portion configured to generate a zero-crossing signal that indicates a first level if an absolute value of AC voltage from the AC power supply is equal to or smaller than a predetermined value, and indicates a second level if the absolute value of the AC voltage is larger than the predetermined value;
a signal width detection portion configured to detect a zero-crossing width and a non-zero-crossing width of the zero-crossing signal, the zero-crossing width being a time width of the zero-crossing signal for a case where the absolute value of the AC voltage is equal to or smaller than the predetermined value, the non-zero-crossing width being a time width of the zero-crossing signal for a case where the absolute value of the AC voltage is equal to or larger than the predetermined value;
a switching portion configured to control ON or OFF of current flowing into a load when AC power from the AC power supply is supplied to the load; and
a switching controlling portion configured to detect a frequency and a voltage value of the AC voltage based on the zero-crossing width detected and the non-zero-crossing width detected, to determine operation of the switching portion depending on the frequency detected and the voltage value detected, and to give a command to the switching portion.

18. An image forming apparatus including a load to which AC power is supplied from an AC power supply and on which phase control is performed, the apparatus comprising:
a zero-crossing signal generation portion configured to generate a zero-crossing signal that indicates a first level if an absolute value of AC voltage from the AC power supply is equal to or smaller than a predetermined value, and indicates a second level if the absolute value of the AC voltage is larger than the predetermined value;
a signal width detection portion configured to detect a zero-crossing width and a non-zero-crossing width of the zero-crossing signal, the zero-crossing width being a time width of the zero-crossing signal for a case where the absolute value of the AC voltage is equal to or smaller than the predetermined value, the non-zero-crossing width being a time width of the zero-crossing signal for a case where the absolute value of the AC voltage is equal to or larger than the predetermined value;
a switching portion configured to control ON or OFF of current flowing into a load when AC power from the AC power supply is supplied to the load; and
a switching controlling portion configured to detect a frequency and a voltage value of the AC voltage based on the zero-crossing width detected and the non-zero-crossing width detected, to determine operation of the switching portion depending on the frequency detected and the voltage value detected, and to give a command to the switching portion.

19. The image forming apparatus according to claim 18, wherein the load is a heater.

20. The image forming apparatus according to claim 18, further comprising an operation portion used for an operator to enter a reference frequency and a reference voltage, the reference frequency being frequency used as a reference of the AC voltage, the reference voltage being used as a reference of the AC voltage, wherein
the switching controlling portion determines operation of the switching portion depending on the reference frequency, the reference voltage, the detected frequency of the AC voltage, and the detected AC voltage.

* * * * *